US011165339B2

(12) United States Patent
Bortis et al.

(10) Patent No.: US 11,165,339 B2
(45) Date of Patent: Nov. 2, 2021

(54) METHOD FOR OPERATING A POWER CONVERTER

(71) Applicant: Infineon Technologies Austria AG, Villach (AT)

(72) Inventors: Dominik Bortis, Zurich (CH); Johann Kolar, Zurich (CH); Jon Azurza, Zurich (CH)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/817,916

(22) Filed: Mar. 13, 2020

(65) Prior Publication Data
US 2020/0295668 A1    Sep. 17, 2020

(30) Foreign Application Priority Data

Mar. 15, 2019 (DE) .................. 102019001816.8
Jun. 7, 2019 (EP) ..................... 19179192
Jun. 14, 2019 (EP) ..................... 19180259

(51) Int. Cl.
*H02M 1/42* (2007.01)
*H02M 7/219* (2006.01)
(Continued)

(52) U.S. Cl.
CPC ......... *H02M 1/4216* (2013.01); *H02M 7/219* (2013.01); *H02M 7/487* (2013.01);
(Continued)

(58) Field of Classification Search
CPC ......... H02M 1/4216; H02M 2001/007; H02M 2001/0077; H02M 7/487; H02M 7/217;
(Continued)

(56) References Cited

U.S. PATENT DOCUMENTS

2003/0128563 A1* 7/2003 Rojas Romero .... H02M 1/4216
363/89

FOREIGN PATENT DOCUMENTS

WO    2018087442 A1    5/2018

OTHER PUBLICATIONS

Ding et al., Voltage independence control of split-DC bus fora three-phase/level T-type converter with unbalanced loads, ECCE 2017, IEEE, pp. 2811-2816 (Year: 2017).*

(Continued)

*Primary Examiner* — Jue Zhang
(74) *Attorney, Agent, or Firm* — Murphy, Bilak & Homiller, PLLC

(57) ABSTRACT

A method for operating a power converter is described. The power converter includes three input nodes each configured to receive a respective one of three input voltages, two DC link nodes configured to provide a DC link voltage, and a midpoint coupled to each DC link node. Three inductors are each connected to a respective one of the three input nodes. A rectifier bridge including three bridge legs are each coupled to a respective one of the three inputs through a respective one of the three inductors and connected to the respective one of the three inductors at a respective switch node. Each bridge leg is connected to the two DC link nodes and the midpoint, and includes at least one electronic switch. The power converter is operated in a reduced switching mode by deactivating at least one of the three bridge legs for a predefined time period.

31 Claims, 25 Drawing Sheets

(51) Int. Cl.
    *H02M 7/487*    (2007.01)
    *H02M 1/00*     (2006.01)
(52) U.S. Cl.
    CPC .......... *H02M 1/007* (2021.05); *H02M 1/0074* (2021.05); *H02M 1/0077* (2021.05)
(58) Field of Classification Search
    CPC ... H02M 1/007; H02M 1/0077; H02M 1/0074
    See application file for complete search history.

(56) References Cited

OTHER PUBLICATIONS

Di Benedetto, Marco, et al., "Low-Frequency State-Space Model for the Five-Level Unidirectional T-Rectifier", IEEE Transactions on Industry Applications, vol. 53, No. 2, Mar./Apr. 2017, pp. 1127-1137.
Soeiro, T. B., et al., "Swiss rectifier a novel three-phase buck-type PFC topology for Electric Vehicle battery charging", IEEE, Applied Power Electronics Conference and Exposition (APEC), Feb. 5, 2012, pp. 2617-2624.

* cited by examiner

METHOD FOR OPERATING A POWER CONVERTER

TECHNICAL FIELD

This disclosure relates in general to a method for operating a power converter.

BACKGROUND

Efficient power conversion using an electronic power converter is an important issue in many electronic applications. Charging batteries of electronic vehicles, for example, requires an efficient power conversion and is gaining importance as the number of electric vehicles of various kinds (cars, bicycles, scooters, etc.) is expected to increase within the next years. In this type application, but also in any other type of power conversion application it is desirable to keep losses associated with the power conversion as low as possible, that is, to keep losses occurring in the power converter and associated with operating the power converter as low as possible.

SUMMARY

One example relates to a method. The method includes operating a power converter in a reduced switching mode. The power converter includes three input nodes each configured to receive a respective one of three input voltages, two DC link nodes configured to provide a DC link voltage, and a midpoint coupled to each of the two DC link nodes. Further, the power converter includes three inductors each connected to a respective one of the three input nodes, and a rectifier bridge including three bridge legs. Each bridge leg is coupled to a respective one of the three inputs through a respective one of the three inductors and is connected to the respective one of the three inductors at a respective switch node. Each of the three bridge legs is further connected to the two DC link nodes and the midpoint and includes at least one electronic switch. Operating the power converter in the reduced switching mode includes deactivating at least one of the three bridge legs for a predefined time period.

Those skilled in the art will recognize additional features and advantages upon reading the following detailed description, and upon viewing the accompanying drawings.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
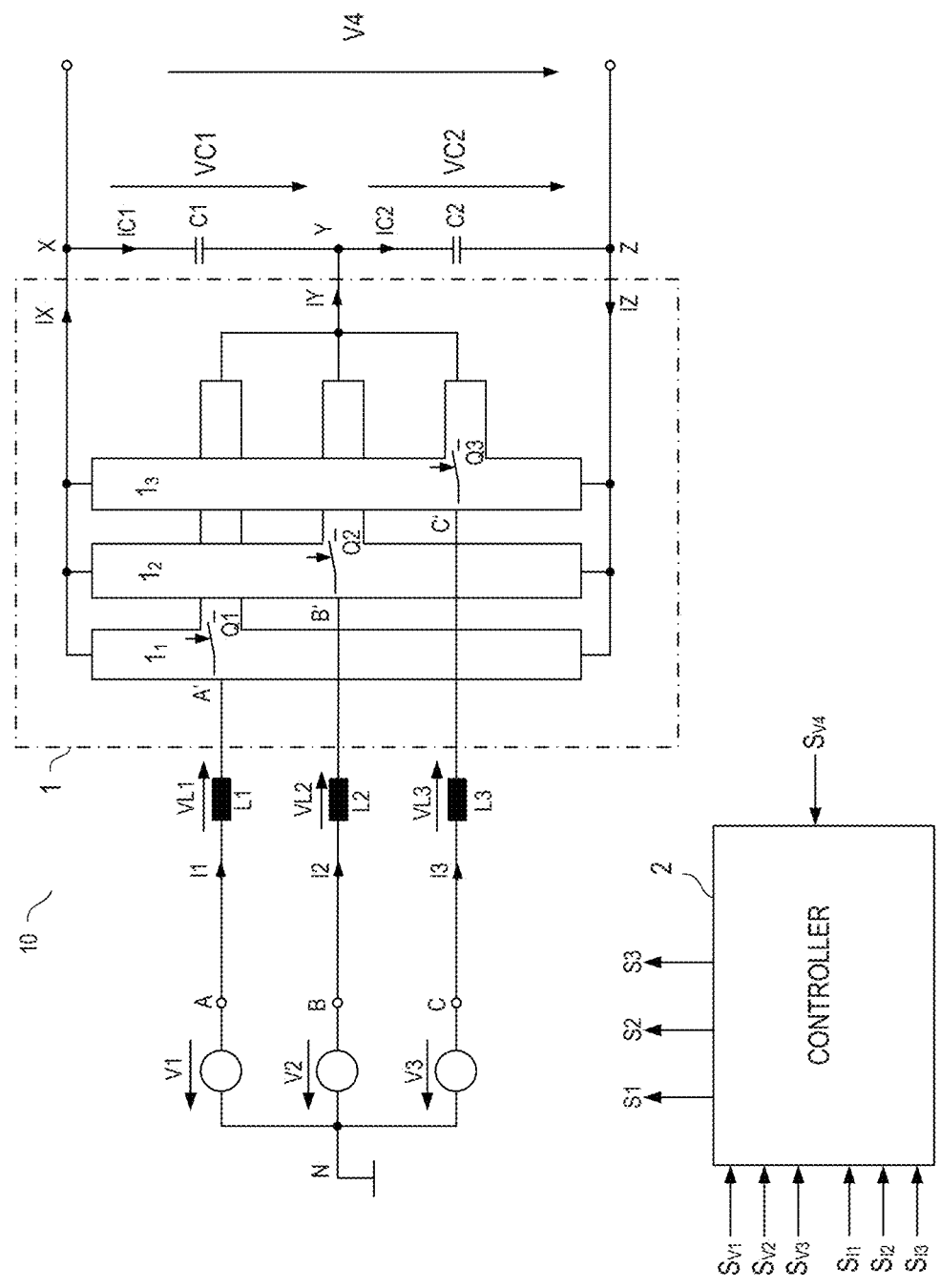
FIG. 1 illustrates a circuit diagram of a power converter with a Vienna rectifier topology.

FIG. 1 shows a circuit diagram of a power converter 10 known as Vienna rectifier, which is a switched-mode three-phase (3Φ) AC-DC power converter. The power converter includes an input with three input nodes A, B, C each configured to receive a respective one of three input voltages V1, V2, V3, two DC link nodes X, Z configured to provide a DC link voltage V4 therebetween, and a midpoint Y coupled to each of the two DC link nodes X, Z. Each of the three input voltages V1, V2, V3 is a voltage between the respective input node A, B, C and a common ground node N. The power converter further includes three inductors L1, L2, L3 each coupled to a respective one of the three input nodes A, B, C. In the example shown in FIG. 1, the inductors L1, L2, L3 are directly coupled to the inputs A, B, C. This, however is only an example. According to another example (not shown) an input filter is connected between the inputs A, B, C and the inductors L1, L2, L3.

Referring to FIG. 1, the power converter further includes a rectifier bridge 1 with three bridge legs $1_1$, $1_2$, $1_3$. Each of the three bridge legs $1_1$, $1_2$, $1_3$, which are only schematically illustrated in FIG. 1, includes at least one electronic switch Q1, Q2, Q3 and is connected to a respective one of the three inductors L1, L2, L3, so that each of the bridge legs 11, 12, 13 is coupled to a respective one of the three inputs A, B, C through a respective one of the three inductors L1, L2, L3. Further each of the three bridge legs $1_1$, $1_2$, $1_3$ is connected to the two DC link nodes X, Z and the midpoint Y.

As illustrated, the midpoint Y may be coupled to a first one X of the two DC link nodes X, Z via a first capacitor C1 and to a second one Z of the two DC link nodes X, Z via a second capacitor C2. A voltage VC1 across the first capacitor C1 is referred to as first capacitor voltage and a voltage VC2 across the second capacitor C2 is referred to as second capacitor voltage in the following.

Figure 2:
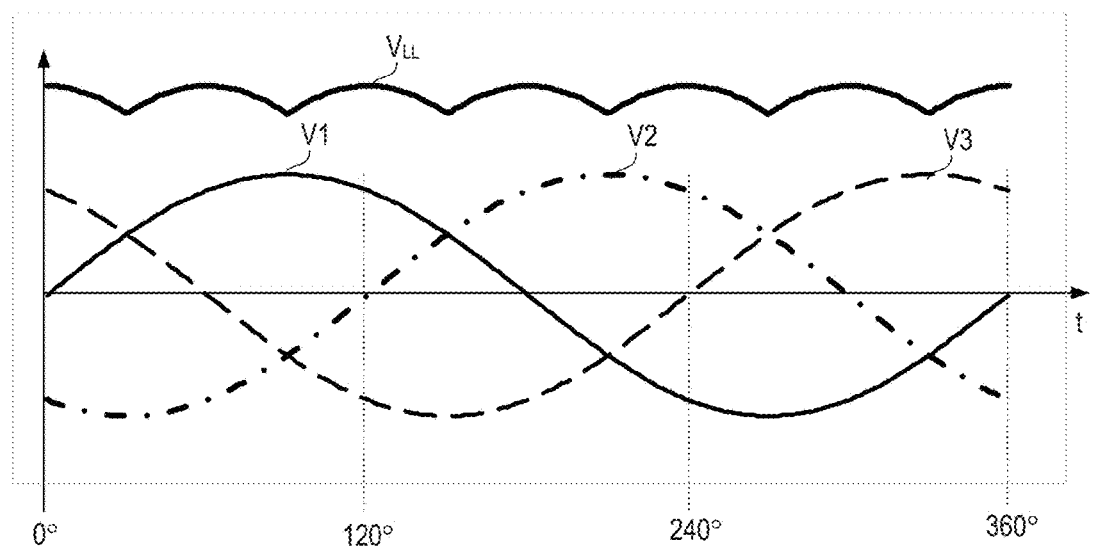
FIG. 2 shows signal diagrams of input voltages of the power converter according to one example.

According to one example, the input voltages V1, V2, V3 received by the power converter are alternating input voltages such as sinusoidal input voltages. A phase shift between each pair of these input voltages V1, V2, V3 may be 120°. FIG. 2 shows signal diagrams of sinusoidal input voltages V1, V2, V3 during one period of each of these input voltages V1, V2, V3. A phase shift between each pair of these input voltages V1-V3 is 120° (2π/3) in this example. Each of the three sinusoidal input voltages V1-V3 periodically changes between a minimum voltage level and a maximum voltage level, wherein the maximum voltage level is a positive voltage level and the minimum voltage level is a negative voltage level in this example. According to one example, a magnitude of the minimum level essentially equals a magnitude of the maximum level and the three input voltages V1-V3 have essentially the same minimum voltage levels and the same maximum voltage levels. Further, the three input voltages V1-V3 may have essentially the same frequency, wherein this frequency is between 50 Hz and 60 Hz, for example.

FIG. 2 illustrates the input voltages V1, V2, V3 dependent on a phase angle. In the following, the plurality of the input voltages V1, V2, V3 is also referred to as input voltage system. Further, for the purpose of illustration, it is assumed that a certain phase angle α of the input voltage system corresponds to a phase angle α of the first input voltage V1, wherein α=0 is the phase angle at the beginning of a positive halfwave of the first input voltage V1.

A magnitude A1, A2, A3 of the maximum voltage level and the minimum voltage level of each of the input voltages V1, V2, V3 may also be referred to as amplitude of the respective input voltage V1, V2, V3. Root mean square (RMS) values $A1_{RMS}$, $A2_{RMS}$, $A3_{RMS}$ of the input voltages are given by the amplitude divided by the square root of 2, that is $A_{RMS}=A/\sqrt{2}$, where A denotes the amplitude of any one of the three input voltages V1, V2, V3 and where $A_{RMS}$ denotes the respective RMS value. According to one example, each of the three input voltages V1, V2, V3 is a 230 $V_{RMS}$ grid voltage, that is $A_{RMS}=A1_{RMS}=A2_{RMS}=A3_{RMS}=230$ $V_{RMS}$. The amplitudes are given by A=A1=A2=A3=325 V in this example.

At each phase of one period of the three input voltages V1, V2, V3 one of the three input voltages has the highest (positive) voltage level of the three input voltages V1, V2, V3 and one of the three input voltages has the lowest (negative) voltage level of the three input voltages V1, V2, V3, wherein in each period each of the three input voltages V1, V2, V3 has the highest level and each of the three input voltages V1, V2, V3 has the lowest level for a certain time period. A difference between the highest voltage level and the lowest voltage level is referred to as line-to-line voltage $V_{LL}$. The line-to-line voltage $V_{LL}$ associated with the input voltages V1, V2, V3 shown in FIG. 2 is also illustrated in FIG. 2. As can be seen, the line-to-line voltage is periodic, wherein the duration of one period of the line-to-line voltage $V_{LL}$ is 1/6 of a duration of one period of the input voltages V1, V2, V3. In other words, one period of the input voltages V1, V2, V3 includes phase angles from 0° to 360° (0 to 2π) and one period of the line-to-line voltage $V_{LL}$ ranges over 60° of one period of the input voltages V1, V2, V3. The maximum of the line-to-line voltage $V_{LL\_MAX}$, which is also referred to as maximum line-to-line voltage in the following, is given by the amplitude A of the three input voltages multiplied with the square root of 3, that is $V_{LL\_MAX}=A\cdot\sqrt{3}$. For example, in an input voltage system with three 230 $V_{RMS}$ input voltages V1, V2, V3, the maximum line-to-line voltage $V_{LL\_MAX}$ is 563V.

Operating a power converter of the type shown in FIG. 1 may include (a) regulating the DC link voltage V4 such that it has a predefined voltage level, and (b) regulating each of the three input currents I1, I2, I3 such that it has a current waveform that essentially equals the waveform of the respective input voltage V1, V2, V3. Thus, these input currents I1, I2, I3 essentially have sinusoidal waveforms when the input voltages V1, V2, V3 are sinusoidal voltages. Regulating each of the input currents I1, I2, I3 may include regulating an inductor voltage VL1, VL2, VL3 across the respective inductor L1, L2, L3, wherein regulating the inductor voltages VL, VL2, VL3 may include regulating voltages VA', VB', VC' at circuit nodes A', B', C' arranged between the inductors L1, L2, L3 and the bridge legs $1_1$, $1_2$, $1_3$. These circuit nodes A', B', C' are referred to as switch nodes of the bridge legs $1_1$, $1_2$, $1_3$, and the voltages VA', VB', VC' at these switch nodes A', B', C', are referred to as switch node voltages in the following, wherein these voltages VA', VB', VC' are referenced to the common ground node N. One example of a method for regulating the inductor voltages VL1, VL2, VL3 in order to regulate the input currents I1, I2, I3 is explained with reference to FIGS. 3 and 4 in the following.

Figure 3:
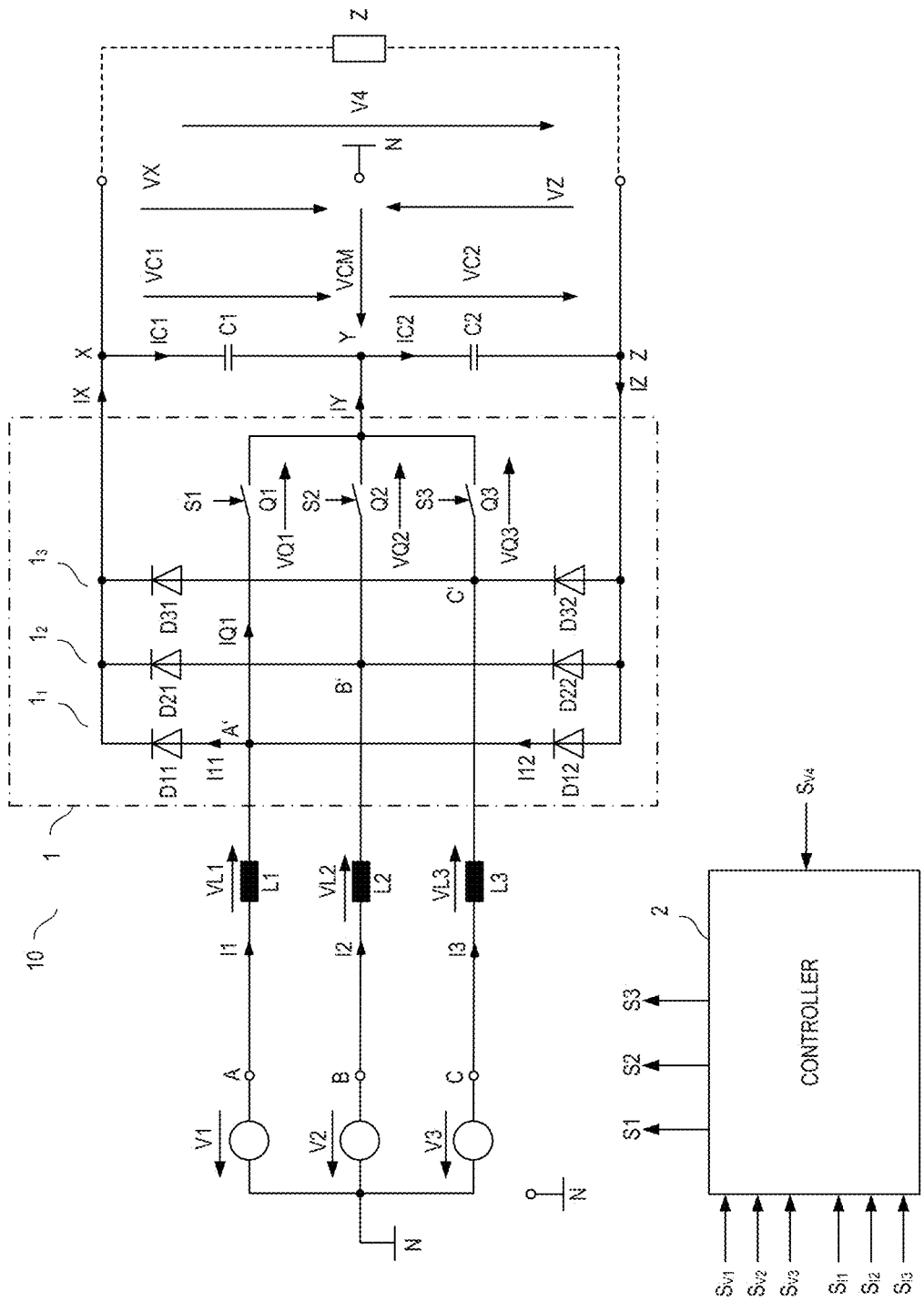
FIG. 3 illustrates one example of a power converter of the type illustrated in FIG. 1 in greater detail.
Figure 4:
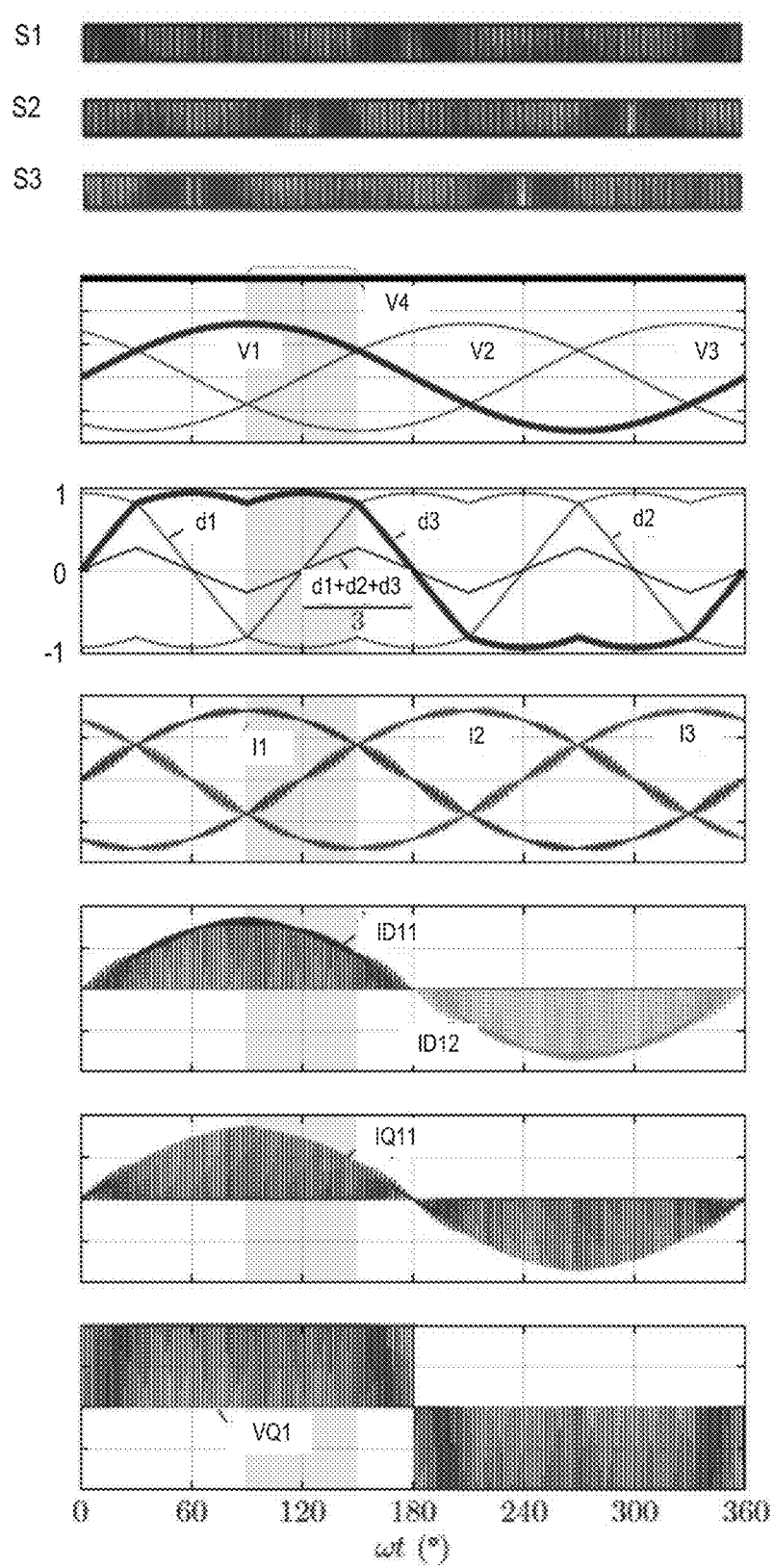
FIG. 4 shows signal diagrams that illustrate operating the power converter in a conventional way.

FIG. 3 illustrates a power converter of the type illustrated in FIG. 1, wherein the bridge legs $1_1$, $1_2$, $1_3$ are implemented in accordance with one specific example. (Further examples for implementing the inductor voltages VL1, VL2, VL3 are explained herein further below.) FIG. 4 illustrates signal diagrams of signals occurring in the power converter during one period of the input voltages V1, V2, V2. In the example illustrated in FIG. 3, each of the bridge legs $1_1$, $1_2$, $1_3$ includes an electronic switch Q1, Q2, Q3 connected between the respective switch node A', B', C' and the midpoint Y, a first rectifier element D11, D21, D31 connected between the respective input node A', B', C' and the first DC link node X, and a second rectifier element D12, D22, D32. The electronic switches Q1, Q2, Q3 may be implemented as bidirectional blocking switches. A "bidirectional blocking switch" is a switch that is capable of blocking a current independent of a polarity of a voltage applied to the electronic switch.

Figure 5:
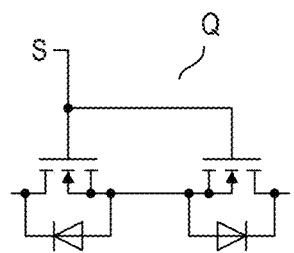
FIG. 5 illustrates one example of a bidirectional blocking switch that may be used in the power converter illustrated in FIG. 3.

One example of a bidirectional blocking switch is illustrated in FIG. 5. In this example, the electronic switch Q (wherein Q represents an arbitrary one of switches Q1, Q2, Q3) includes two MOSFETs (Metal Oxide Semiconductor Field Effect Transistors) that are connected in series such that integrated body diodes are connected in a back-to-back configuration. That is, these MOSFETs are connected in series such that the body diodes integrated in these MOSFETs either have their anodes connected or have their cathodes connected. The two MOSFETs may be driven by the same drive signal S (wherein S represents an arbitrary one of the drive signals 51, S2, S3 received by the switches Q1, Q2, Q3). However, implementing the bidirectional switches Q1, Q2, Q3 in the way illustrated in FIG. 5 is only an example. Any other type of bidirectional electronic switch, such as a HEMT (High Electron-Mobility Transistor) may be used as well.

Referring to FIG. 3, the first and second rectifier elements D11-D32 may be implemented as passive rectifier elements such as diodes. This, however, is only an example. Active rectifier elements such as MOSFETs operated as synchronous rectifiers may be used as well.

In the example illustrated in FIG. 3, the first rectifier elements D11, D21, D31 are configured to enable a (positive) current flow from the respective switch node A', B', C' towards the first DC link node X and the second rectifier elements D12, D22, D32 are configured to enable a (positive) current flow from the second DC link node Z towards the respective switch node A', B', C'. That is, in the example shown in FIG. 3, the diodes forming the first rectifier elements D11, D21, D31 have their cathodes connected to the first DC link node X and have their anodes connected to the respective input node A', B', C', and the diodes forming the second rectifier elements D12, D22, D32 have their anodes connected to the second DC link node Z and have their cathodes connected to the respective input node A', B', C'.

Referring to the above, controlling the current I1, I2, I3 through each of the inductors L1, L2, L3 includes controlling the voltage VL1, VL2, VL3 across the respective inductor L1, L2, L3. Each inductor voltage VL1, VL2, VL3 is given by the respective input voltage V1, V2, V3 minus the respective switch node voltage VA', VB', VC'. The input voltages V1, V2, V3 are predefined by a voltage source such as a power grid and can be measured, so that the inductor voltages VL1, VL2, VL3 and, therefore, the inductor currents I1, I2, I3 can be regulated by regulating the switch node voltages VA', VB', VC'. This is explained with reference to FIG. 4 in the following.

FIG. 4 illustrates drive signals S1, S2, S3 of the electronic switches Q1, Q2, Q3, sinusoidal input voltages V1, V2, V3 and corresponding input currents I1, I2, I3, which are essentially sinusoidal. FIG. 4 further illustrates currents ID11, ID12 through the first and second rectifier elements D11, D12 in a first one $1_1$ of the bridge legs $1_1$, $1_2$, $1_3$, a current IQ1 through the electronic switch Q1 in the first bridge leg $1_1$, and a voltage VQ1 across the electronic switch Q1 in the first bridge leg $1_1$.

For the purpose of explanation it is assumed that the power converter is in a steady state in which the DC link voltage V4 has already reached a desired voltage level and that a power consumption of a load Z (illustrated in dashed lines in FIG. 3) connected to the DC link nodes X, Z is constant. This load may be an arbitrary load, including a load that includes a further power converter. Referring to FIG. 4, the power converter may be operated in a continuous conduction mode (CCM), that is, the inductor currents I1, I2, I3 do not decrease to zero during each of the positive and the negative halfwave of the respective input voltage V1, V2, V3. (The input currents I1, I2, I3 turn zero only for a short time period when the respective input voltage V1, V2, V3 crosses zero).

Current flow directions of the inductor currents I1, I2, I3 are dependent on instantaneous voltage levels of the input voltages V1, V2, V3 and the midpoint voltage VY. The "midpoint voltage" VY is the voltage at the midpoint Y, which is not directly connected to the ground node N, referenced to the ground node N. The midpoint voltage VY or the negative −VY of the midpoint voltage may also be referred to as common mode voltage VCM in the following. Just for the purpose of illustration, in the following, the negative of the midpoint voltage VY is referred to as the common mode voltage, VCM=−VY. The common mode voltage VCM may be regulated such that it is zero, so that the potential at the midpoint equals the potential at the ground node. Alternatively, the common mode voltage VCM may be regulated such that it is different from zero and varies over one period of the input voltages V1, V2, V3. In each of these cases, the inductor currents can be regulated such that each inductor current I1, I2, I3 is positive during the positive halfwave of the respective input voltage V1, V2, V3 and negative during the negative halfwave of the respective input voltage V1, V2, V3. Examples for regulating the common mode voltage VCM are explained in further detail herein below.

Controlling the input currents I1, I2, I3 is explained in the following with reference to controlling the current I1 through a first one L1 of the inductors L1, L2, L3, which is the inductor connected to the first bridge leg 11. Regulating the other two I2, I3 of the input currents I1, I2, I3 is achieved in the same way. In the following the input A coupled to the first bridge leg $1_1$ is referred to as first input, the voltage V1 received at this input is referred to as first input voltage, the switch node A' of the first bridge leg $1_1$ is referred to as first switch node, the inductor L1 connected to the first switch node A' is referred to as first inductor, and the voltage VL1 across the first inductor L1 is referred to as first inductor voltage VL1.

During the positive halfwave of the first input voltage V1, the first inductor current I1 is positive, that is, the inductor current flows in a direction as indicated by the arrow in FIG. 3. In this case, the inductor current I1 flows through the first rectifier element D11 during the off-period of the first switch Q1, that is, after the first switch Q1 has been switched off. During the off period of the electronic switch Q1, the voltage VA' at the first switch node A' is given by the voltage VX at the first DC link node X minus a voltage drop across the first rectifier element D11. This voltage drop across the first rectifier element, however, is negligible so that during the off-period of the first electronic switch Q1, the potential at the first switch node A' is essentially clamped to the voltage VX at the first DC link node X. This voltage VX is referenced to the ground node and is referred to as first DC link node voltage in the following.

During the negative halfwave of the first input voltage V1, the first inductor current I1 is negative, that is, the inductor current flows in a direction opposite the direction as indicated by the arrow in FIG. 3. In this case, the inductor current I1 flows through the second rectifier element D12 during the off-period of the first switch Q1. During the off period of the electronic switch Q1, the potential at the first switch node A' is given by the voltage VZ at the second DC link node Z minus a voltage drop across the second rectifier element D12. This voltage drop across the second rectifier element, however, is negligible so that during the off-period of the first electronic switch Q1, the potential at the first switch input node A' is essentially clamped to the voltage VZ at the second DC link node Z. This voltage VZ is referenced to the ground node and is referred to as second DC link node voltage in the following.

In the power converter shown in FIG. 3, the voltage VA' at the first switch node A' (as well as at the other two switch nodes B', C') can have three different levels dependent on a polarity of the first input voltage V1 and the switching state of the first electronic switch Q1: (1) VA'=VY during on-periods of the electronic switch Q1; (2) VA'=VX during off-periods of the electronic switch Q1 and when the first input voltage V1 is positive, that is, during the positive halfwave of the first input voltage V1; and (3) VA'=VZ during off-periods of the electronic switch Q1 and when the first input voltage V1 is negative, that is, during the negative halfwave of the first input voltage V1.

The first DC link node voltage VX is given by the first capacitor voltage VC1 minus the common mode voltage VCM, $$VX = VC1 - VCM \quad (1a),$$

and the second DC link node voltage VZ is given by the common mode voltage VCM multiplied with minus 1 minus the second capacitor voltage VC2, $$VZ = -VC2 - VCM = -(VC2 + VCM) \quad (1b),$$

wherein, just for the purpose of illustration, it is assumed that the common voltage VCM is VN−VY, wherein VN is the potential at the ground node N and VY is the potential at the midpoint.

The common mode voltage VCM can be positive and negative. In each case, the magnitude of the common mode voltage VCM is lower than the magnitude of each of the first and second capacitor voltages, so that the first DC link node voltage VX is positive and the second DC link node voltage VZ is negative.

The voltage VL1 across the first inductor L1 is given by $$VL1 = L1 \cdot \frac{dI1}{dt},$$

where L1 denotes the inductance of the first inductor L1. Thus, the inductor current I1 increases when the inductor voltage VL1 is positive, and decreases when the inductor voltage VL1 is negative, and remains constant when the inductor voltage VL1 is zero. By suitably switching the voltage VA' at the first switch node A' between two of these three voltage levels VX, VY, VZ the first input current I1 can be generated such that it follows a sinusoidal waveform. During the positive halfwave of the first input voltage V1, (a) the inductor current I1 increases during on-periods of the first switch Q1, and (b) decreases during off-periods of the first switch Q1 switches. During the negative halfwave of the first input voltage V1, (c) the inductor current I1 increases during on-periods of the first switch Q1 and (d) decreases during off-periods of the first switch Q1. In each case, the inductor current I1 increases, when the average of the inductor voltage VL1 over one-period and one off-period of the first switch Q1 is positive and decreases when the average of the inductor voltage VL1 over one-period and one off-period of the first switch Q1 is negative.

The electronic switch Q1 (as well as the other switches Q2, Q3) may be operated in a pulse-width modulated (PWM) fashion at a fixed switching frequency $f_{SW}$, which is significantly higher than the frequency of the first input voltage V1. The switching frequency $f_{SW}$ is between several kHz and several 10 kHz and may range up to several 100 kHz, for example. In order to adjust the first switch node voltage VA' a duty cycle d1 of operating the first switch Q1 varies, wherein in each drive cycle the duty cycle d1 is given by a relationship between one of the duration $T_{ON}$ of the on-period of the electronic switch Q1 or a duration $T_{OFF}$ of the off-period of the electronic switch Q1 and the duration T of one drive cycle, wherein the duration T of the drive cycle is given by the reciprocal of the switching frequency ($T=1/f_{SW}$). The duration $T_{OFF}$ of the off-period of the electronic switch Q1 is given by the duration T of the drive cycle minus the duration $T_{ON}$ of the on-period, $T_{OFF}=T-T_{ON}$. Just for the purpose of illustration it is assumed that a magnitude |d1| of the duty cycle d1 is given by the ratio between the duration $T_{OFF}$ of the off-period and the duration T of the drive cycle, $$|d1| = \frac{T_{OFF}}{T}.$$

Further, it is assumed, that the duty cycle d1 can be positive or negative, wherein the duty cycle d1 is positive during the positive halfwave of the first input voltage V1 and negative during the negative halfwave of the first input voltage V1. For example, a duty cycle d1=0 indicates the first switch Q1 is switched on during a respective drive cycle; a duty cycle d1=1 indicates that the first switch Q1 is switched off during a respective drive cycle in the positive halfwave of the first input voltage V1; and a duty cycle d1=−1 indicates the first switch Q1 is switched off during a respective drive cycle in the negative halfwave of the first input voltage V1. A positive duty cycle d1 different from one (1) or zero (0) represents a ratio between the duration of the on-period and the off-period in a drive cycle in the positive halfwave of the first input voltage V1. Equivalently, a negative duty cycle d1 different from 1 or zero represents a ratio between the duration of the on-period and the off-period in a drive cycle in the negative halfwave of the first input voltage V1.

Referring to the above, the first switch node voltage VA' is obtained by switching between the first DC link node voltage VX and the midpoint voltage VY, or between the second DC link node voltage VZ and the midpoint voltage VY. The first switch node voltage A' is therefore given by the average voltage at the first switch node A' in one drive cycle. During the positive halfwave of the input voltage V1, for example, the first switch node voltage VA' is given by $$VA' = \frac{VY \cdot T_{ON} + VX \cdot T_{OFF}}{T} = \frac{-VCM \cdot T_{ON} + (-VCM + VC1) \cdot T_{OFF}}{T} = -VCM + \frac{T_{OFF}}{T} \cdot VC1, \quad (2a)$$

and during the negative halfwave of the input voltage V1, for example, the first switch node voltage VA' is given by $$VA' = \frac{VY \cdot T_{ON} + VZ \cdot T_{OFF}}{T} = \qquad (2b)$$

$$\frac{-VCM \cdot T_{ON} + (-VCM - VC2) \cdot T_{OFF}}{T} = -VCM - \frac{T_{OFF}}{T} \cdot VC2.$$

Thus, by suitably adjusting the duty cycle d1 of the first electronic switch Q1, the first switch node voltage VA' and, therefore, the first inductor voltage VL1 can be adjusted. On the other hand, based on the desired first switch node voltage VA' and the common mode voltage VCM the duty cycle d1 can be calculated. Referring to the above, the duty cycle d1 is given by the ratio between the duration TOFF of the off-period and the duration T of one drive cycle, and the duty cycle d1 is positive in the positive halfwave of the first input voltage V1 and negative in the negative halfwave of the first input voltage V1. Thus, $$\frac{T_{OFF}}{T} = d1$$

in equation (2a) and $$-\frac{T_{OFF}}{T} = d1$$

in equation (2b). Thus, during the positive halfwave, the duty cycle d1, based on equation (2a), is given by $$d1 = \frac{VA' + VCM}{VC1}, \qquad (3a)$$

and, during the negative halfwave, the duty cycle d1, based on equation (2b), is given by $$d1 = \frac{VA' + VCM}{VC2}. \qquad (3b)$$

The capacitor voltages VC1, VC2 may be regulated such that each of these voltages is 50% of the DC link voltage V4, so that VC1=VC2=V4/2. In this case, the duty cycle d1 can be calculated as follows based on equations (3a) and (3b), $$d1 = \frac{VA' + VCM}{V4/2}. \qquad (3c)$$

Referring to FIGS. 1 and 3, the power converter includes a control circuit 2 that is configured to operate the at least one electronic switch Q1, Q2, Q3 in each of the bridge legs $1_1$, $1_2$, $1_3$. More specifically, this control circuit 2 may be configured to generate drive signals S1, S2, S3 received by the electronic switches Q1, Q2, Q3 such that the DC link voltage V4 has a predefined voltage level and such that the inductor currents (the input currents) I1, I2, I3 essentially have the same waveform as the input voltages V1, V2, V3. For this, the control circuit 2 receives a DC link voltage signal $S_{V4}$, wherein the DC link voltage signal $S_{V4}$ represents the DC link voltage V4. The DC link voltage V4 may be measured in a conventional way by any kind of voltage measurement circuit (not shown) in order to obtain the DC link voltage signal $S_{V4}$. Further, the control circuit 2 receives input voltage signals $S_{V1}$, $S_{V2}$, $S_{V3}$, each representing a respective one of the input voltages V1, V2, V3 and input current signals $S_{I1}$, $S_{I2}$, $S_{I3}$ each representing a respective one of the input currents I1, I2, I3. The input voltage V1, V2, V3 may be measured in a conventional way in order to obtain the input voltage signals $S_{V1}$, $S_{V2}$, $S_{V3}$. Further, the input currents I1, I2, I3 may be measured in a conventional way in order to obtain the input current signals $S_{I1}$, $S_{I2}$, $S_{I3}$. One example of a control circuit 2 configured to generate the drive signals S1-S3 is illustrated in FIG. 6.

Figure 6:
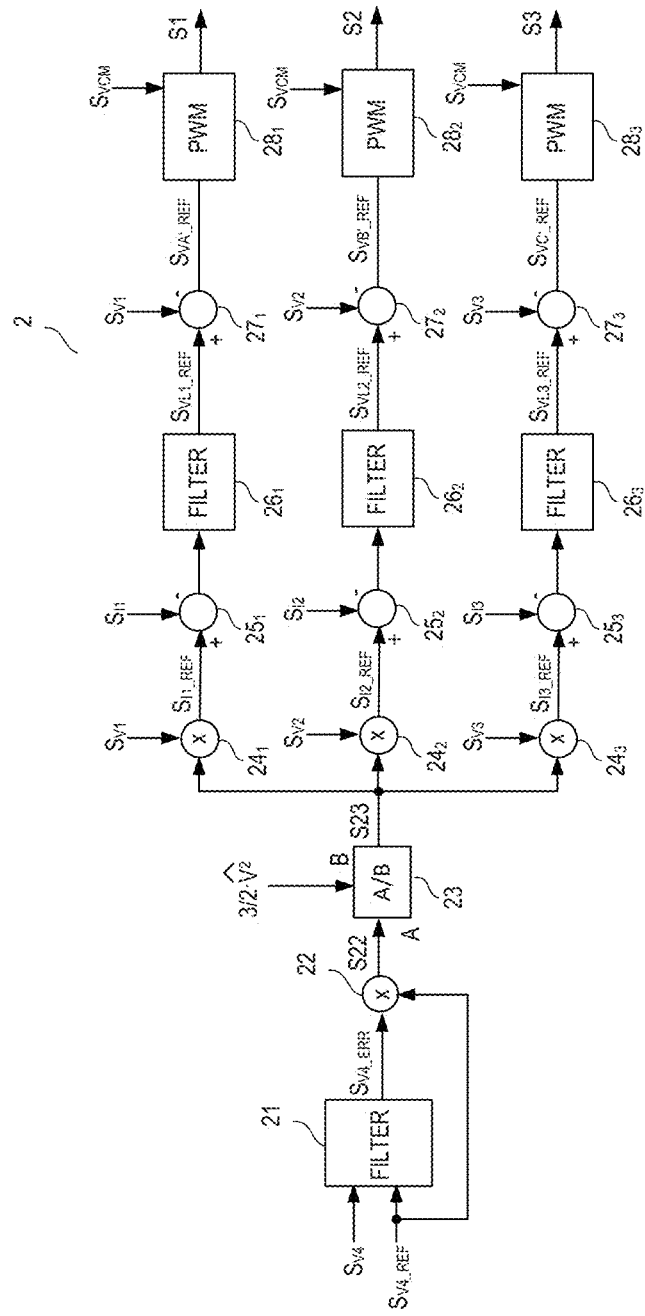
FIG. 6 illustrates one example of a control circuit configured to operate the power converter in accordance with the method illustrated in FIG. 4.

The control circuit 2 shown in FIG. 6 includes a first filter 21 that receives the DC link voltage signal $S_{V4}$ and a DC link voltage reference signal $S_{V4\_REF}$, wherein the DC link voltage reference signal $S_{V4\_REF}$ represents the desired voltage level of the DC link voltage V4. The filter 21 subtracts the DC link voltage reference signal $S_{V4\_REF}$ from the DC link voltage signal $S_{V4}$ and filters the difference in order to generate a DC link voltage error signal $S_{V4\_ERR}$. The filter (or controller) may have one of a proportional (P) characteristic, a proportional-integrative (PI) characteristic, a proportional-integrative-derivative (PID) characteristic, or the like. A multiplier 22 receives the DC link voltage error signal $S_{V4\_ERR}$ and the DC link voltage reference signal $S_{V4\_REF}$, wherein an output signal S22 of the multiplier 22 represents a desired output power of the power converter. A divider 23 divides the multiplier output signal S22 by a signal that represents 1.5 times the square of the amplitude of the input voltages V1, V2, V3 ($3/2 \cdot \hat{V}^2$). An output signal S23 of the divider 23 represents an overall desired input current of the power converter, wherein the overall desired input current is the input current that is required by the power converter in order to achieve the desired voltage level of the DC link voltage V4 as defined by the DC link voltage reference signal $S_{V4\_REF}$.

Referring to FIG. 6, the control circuit 2 further includes three branches, wherein each of these branches receives the divider output signal S23 and generates a respective one of the three drive signals S1, S2, S3. Each of these branches includes a multiplier $24_1$, $24_2$, $24_3$ that multiplies the divider output signal S23 with the respective input voltage signal $S_{V1}$, $S_{V2}$, $S_{V3}$, wherein an output signal of each of these multipliers $24_1$, $24_2$, $24_3$ is an input current reference signal $S_{I1\_REF}$, $S_{I2\_REF}$, $S_{I3\_REF}$, that is, each of these signals $S_{I1\_REF}$, $S_{I2\_REF}$, $S_{I3\_REF}$ represents the desired current level of a respective one of the input currents I1, I2, I3. From each of these reference signals $S_{I1\_REF}$, $SI_{2\_REF}$, $S_{I3\_REF}$ the respective input current signal $S_{I1}$, $S_{I2}$, $S_{I3}$ is subtracted by a respective subtractor $25_1$, $25_2$, $25_3$ connected downstream the respective multiplier $24_1$, $24_2$, $24_3$. The output signal of each of these subtractors $25_1$, $25_2$, $25_3$ is filtered by a respective filter $26_1$, $26_2$, $26_3$ connected downstream the respective subtractor $25_1$, $25_2$, $25_3$, wherein an output signal $S_{VL1\_REF}$, $S_{VL2\_REF}$, $S_{VL3\_REF}$ of the respective filter $26_1$, $26_2$, $26_3$ represents a desired voltage level of a respective one of the three inductor voltages VL1, VL2, VL3. A further subtractor $27_1$, $27_2$, $27_3$ subtracts the input voltage signal $S_{V1}$, $S_{V2}$, $S_{V3}$ from the respective inductor voltage reference signal $S_{VL1\_REF}$, $S_{VL2\_REF}$, $SV_{L3\_REF}$ in order to obtain switch node voltage reference signals $S_{VA'\_REF}$, $S_{VB'\_REF}$, $S_{VC'\_REF}$, wherein each of these switch node voltage reference signals $S_{VA'\_REF}$, $S_{VB'\_REF}$, $S_{VC'\_REF}$ represents the desired voltage level of a respective one of the three leg input voltages VA', VB', VC'.

Referring to FIG. 6, each of the three branches that generate the drive signals S1, S2, S3 includes a PWM modulator $28_1$, $28_2$, $28_3$ that receives a respective one of the leg input voltage reference signals $S_{VA'\_REF}$, $S_{VB'\_REF}$, $S_{VC'\_REF}$, wherein each of these modulators $28_1$, $28_2$, $28_3$ is configured to generate a respective one of the drive signals S1, S2, S3 based on the respective reference signal $S_{VA'\_REF}$, $S_{VB'\_REF}$, $S_{VC'\_REF}$ such that in each drive cycle of the at least one electronic switch Q1, Q2, Q3 an average of the respective leg input voltage VA', VB', VC' equals the voltage level as defined by the respective leg input voltage reference signal $S_{VA'\_REF}$, $S_{VB'\_REF}$, $S_{VC'\_REF}$. The specific implementation of the PWM modulators $28_1$, $28_2$, $28_3$ is dependent on the type of a bridge leg $1_1$, $1_2$, $1_3$ used in the power converter.

In a 3-level power converter, that is, a power converter implemented with bridge legs as illustrated in FIG. 3 and FIGS. 7A-7C, for example, each of the PWM modulators $28_1$, $28_2$, $28_3$ may be configured to calculate the duty cycles d1, d2, d3 of the drive signals S1, S2, S3 based on one of equations (3a), (3b) or (3c) and generate the drive signals S1, S2, S3 in accordance with the calculated duty cycle.

Referring to these equations, by suitably adjusting the duty cycles d1, d2, d3 not only the switch node voltages VA', VB', VC' but also the common mode voltage VCM can be adjusted. Basically, in order to achieve a sinusoidal current waveform, the first DC link node voltage VX has to be equal to or higher than the highest voltage level of the three input voltages V1, V2, V3 and the second DC link node voltage VZ has to be equal to or lower than the lowest voltage level of the three input voltages V1, V2, V3. If, for example, it is desired that the common mode voltage VCM is zero, each of the capacitor voltages VC1, VC2 has to be higher than the amplitude of the three input voltages. Thus, when the input voltages V1, V2, V3 are 230 $V_{RMS}$ voltages, each of the capacitor voltages has to be higher than 325V, so that the DC link voltage has to be higher than 650V (=2*325V). If, for example, the DC link voltage is twice the amplitude of the input voltages and the common mode voltage VCM is zero, the duty cycles d1, d2, d3 as defined by equations (3a), (3b) and (3c), in the steady state, essentially follow the respective input voltage V1, V2, V3.

In some cases, however, it may be desirable to regulate the DC link voltage V4 to a voltage level that is lower than twice the amplitude of the input voltages V1, V2, V3. This can be achieved by suitably adjusting the common mode voltage VCM. In the example illustrated in FIG. 4, the common voltage VCM (which is not illustrated) has been selected such that it equals −(Vmax'+Vmin')/2, wherein Vmax' denotes the voltage level of the highest one of the three switch node voltages VA', VB', BC' at a certain time instance, that is Vmax'=max{VA'; VB'; BC'}, and Vmin' denotes the lowest one of the three switch node voltages at a certain time instance, that is Vmin'=min{VA'; VB'; BC'}. In the steady state, the switch node voltages VA', VB', BC' follow the input voltages V1, V2, V3 and can be considered to be essentially equal to the input voltages V1, V2, V3 (the inductor voltages VL1, VL2, VL3 are low as compared to the input voltages V1, V2, V3). In order to adjust the duty cycles, the PWM modulators $28_1$, $28_2$, $28_3$ may each receive a common mode voltage signal $S_{VCM}$ that represents the desired common mode voltage. This common mode signal $S_{VCM}$ may be provided by a central controller (which is not illustrated). This central controller may be a microcontroller or the like.

In the method illustrated in FIG. 4, the electronic switch Q1, Q2, Q3 in each of the bridge legs 11, 12, 13 is operated in the PWM mode throughout the period of the input voltages V1, V2, V3. This type of operating mode will also be referred to as 3/3 mode in the following.

Figure 7A:
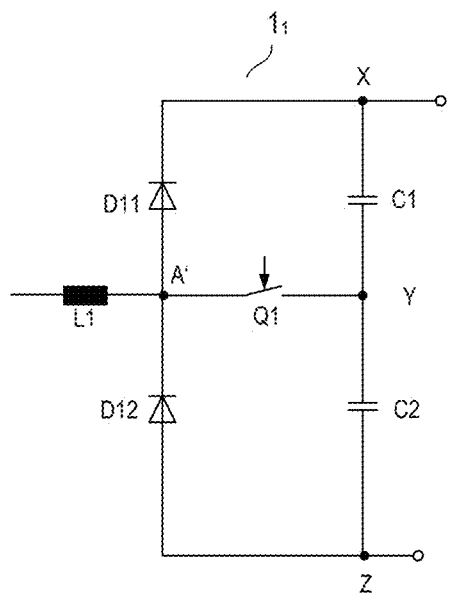
FIGS. 7A-7F illustrate different examples of bridge legs of a bridge rectifier in a power converter of the type illustrated in FIG. 1.

Referring to the above, the bridge legs $1_1$, $1_2$, $1_3$ can be implemented in various ways. Some examples for implementing the individual bridge legs $1_1$-$1_3$ are explained with reference to the first bridge leg $1_1$ in the following. The second and third bridge leg $1_2$, $1_3$ can be implemented in the same way as the first bridge leg $1_1$. FIG. 7A illustrates a first example of the first bridge leg $1_1$. In this example, the first bridge leg $1_1$ is implemented in the way explained with reference to FIG. 3. That is, the bridge leg $1_1$ includes a bidirectional blocking switch Q1 connected between the first switch node A' and the midpoint Y, a first rectifier element D11 connected between the first switch node A' and the first DC link node X, and a second rectifier element D12 connected between the second DC link node Z and the first switch node A'.

Figure 7B:
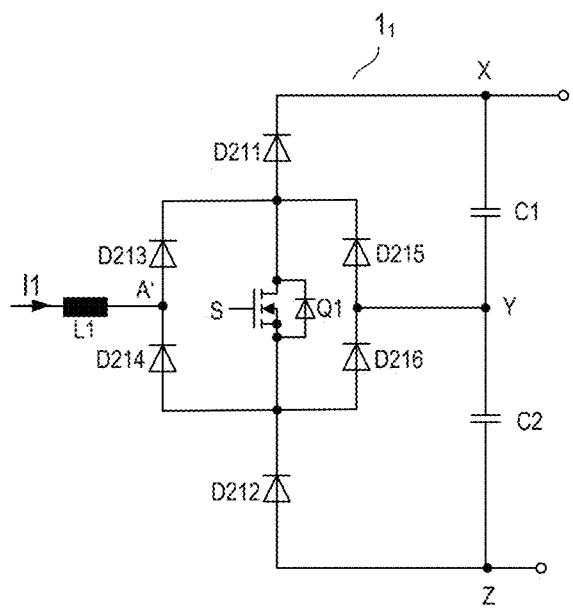

A second example for implementing the first bridge leg $1_1$ is illustrated in FIG. 7B. In this example, the bridge leg $1_1$ includes a first rectifier element D211 connected to the first DC link node X, a second rectifier element D212 connected to the second DC link node Z, a third rectifier element D213 connected between the switch node A' and the first rectifier element D211, a fourth rectifier element D214 connected between the switch node A' and the second rectifier element D212, a fifth rectifier element D215 connected between the midpoint Y and the first rectifier element D211, and a sixth rectifier element D216 connected between the midpoint Y and the second rectifier element D212. Further, an electronic switch Q1 is connected between the first and second rectifier elements D211, D212. This electronic switch Q1 may be a unidirectional electronic switch such as, for example, a MOSFET. Referring to FIG. 7B, the rectifier elements D211-D216 may be implemented as diodes. These rectifier elements D211-D216 are connected such that during the positive halfwave of the first input voltage V1, the inductor current I1 can flow from the first switch node A' via the third rectifier element D213, the electronic switch Q1 and the sixth rectifier element D216 to the midpoint Y, when the electronic switch Q1 is switched on. When the electronic switch Q1 is switched off, the inductor current I1 flows via the third rectifier element D213 and the first rectifier element D211. During the negative halfwave of the input voltage V1, the current flows from the midpoint Y via the fifth rectifier element D215 and the fourth rectifier element D214 to the first switch node A' when the electronic switch Q1 is switched on. When the electronic switch Q1 is switched off, the current flows from the second DC link node Z via the second rectifier element D212 and the fourth rectifier element D214 to the first switch node A'.

Figure 7C:
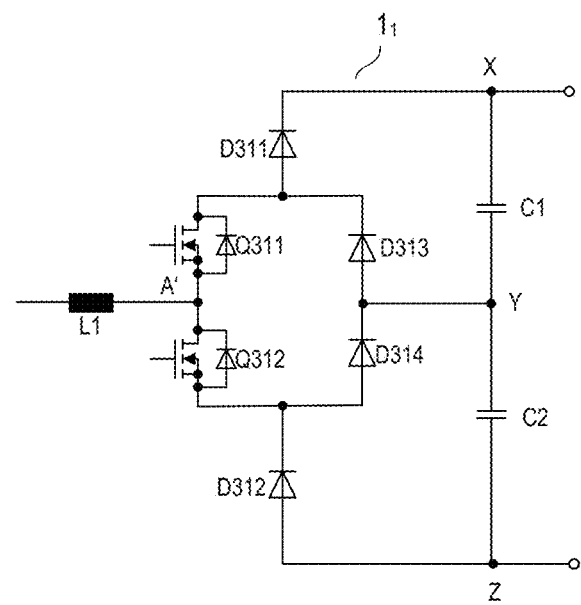

FIG. 7C shows a third example of the first bridge leg $1_1$. In this example, the first bridge leg $1_1$ includes a first rectifier element D311 connected to the first DC link node X, a second rectifier element D312 connected to the second DC link node Z, a first switch Q311 connected between the first switch node A' and the first rectifier element D311, a second switch Q312 connected between the first switch node A' and the second rectifier element D312, a third rectifier element D313 connected between the midpoint Y and the first rectifier element D311, and a fourth rectifier element D314 connected between the midpoint Y and the second rectifier element D312.

The electronic switches Q311, Q312 may be unidirectional blocking switches such as, for example, MOSFETs.

The electronic switches Q311, Q312 and the rectifier elements D311-D314 may be connected such that during the positive halfwave of the input voltage V1 the inductor current I1 flows via the switch node A' via the second electronic switch Q312 and the fourth rectifier element D314 to the midpoint Y when the second electronic switch Q312 is switched on. When the second electronic switch Q312 is switched off, the inductor current I1 flows via the first electronic switch Q311 and the first rectifier element D311 to the first DC link node X. The first electronic switch Q311, Q312 may be switched on and off at the same time. In this case, during the off-period, the inductor current I1 flows via the body diode of the MOSFET forming the first electronic switch Q311 and the first rectifier element D311. According to another example, the first and second electronic switch Q311, Q312 are operated in a complementary fashion, so that only one of the switches is switched on at the same time. In this case, the first switch Q311 is switched on when the second switch Q312 switches off, so that the inductor current I1 flows via the switched on first electronic switch Q311 and the first rectifier element D311.

During the negative halfwave of the input voltage V1, the inductor current I1 flows from the midpoint Y via the third rectifier element D311 and the first electronic switch Q311 to the first switch node A' when the first electronic switch Q311 is switched on. When the first electronic switch Q311 is switched off, the inductor current I1 flows from the second DC link node Z via the second rectifier element D311 and the second electronic switch Q312 to the first switch node A'.

Figure 7D:
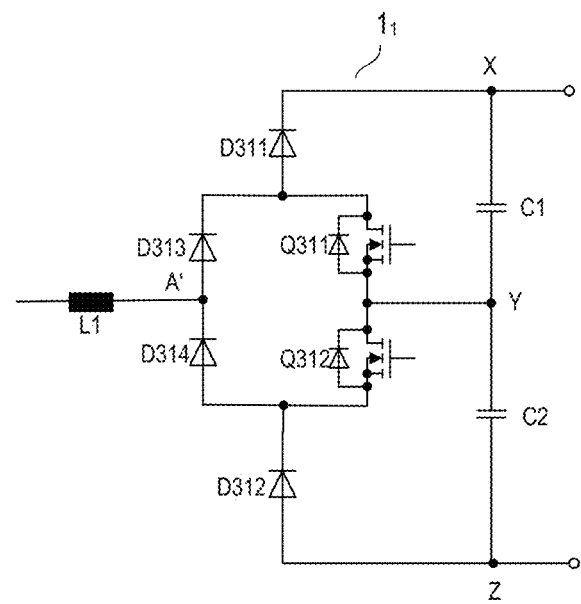

FIG. 7D shows a modification of the bridge leg 11 shown in FIG. 7C. In the example shown in FIG. 7D the first switch Q311 is connected between the midpoint Y and the first rectifier element D311, the second switch Q312 is connected between the midpoint Y and the second rectifier element D312, the third rectifier element D313 is connected between the switch node A' and the first rectifier element D311, and the fourth rectifier element D314 is connected between the switch node A' and the second rectifier element D311.

Each of the bridge legs 11 shown in FIGS. 7A, 7B, 7C and 7D is configured to provide three different voltage levels at the first switch node A'. Using one of the bridge legs $1_1$ shown in FIGS. 7A to 7D, the average electrical potential at the first switch node A' during one drive cycle is generated from two voltage levels, the electrical potential VX at the first DC link node X and the electrical potential VY at the midpoint Y during the positive halfwave at the input voltage V1, and the electrical potential VZ at the second DC link node Z and the electrical potential VY at the midpoint Y during the negative halfwave of the input voltage V1.

Figure 7E:
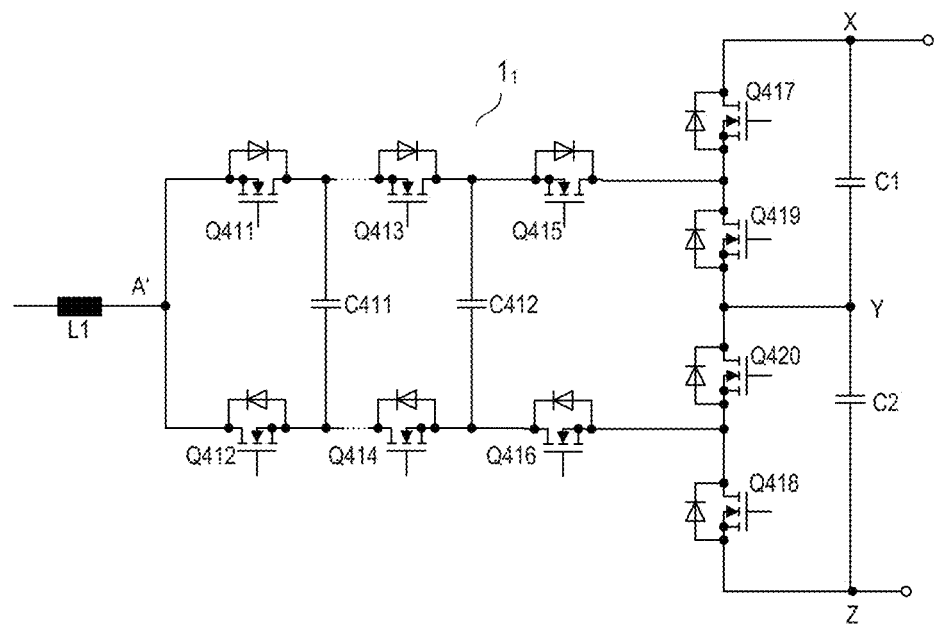
Figure 7F:
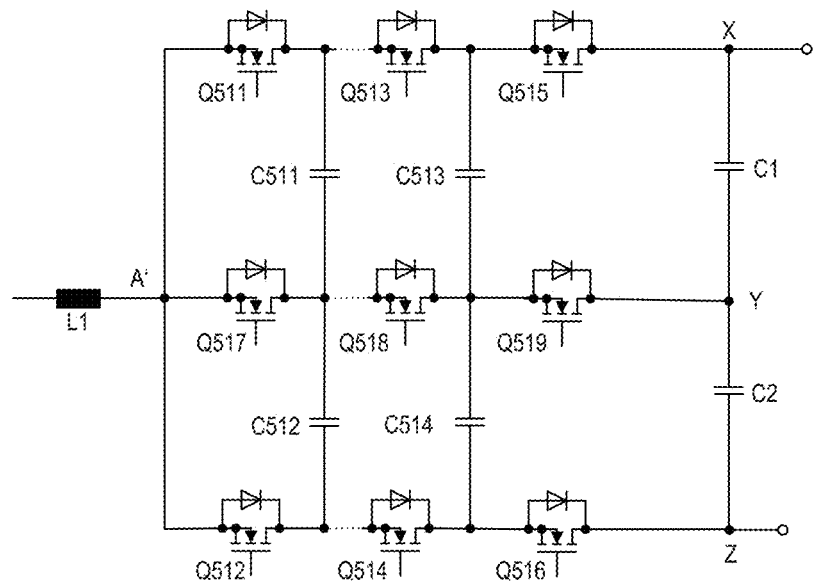

FIGS. 7E and 7F illustrate further examples of the first bridge leg $1_1$. In these examples, the bridge leg $1_1$ includes capacitors in addition to DC link capacitors C1, C2. In these examples, in each of the positive halfwave and the negative halfwave of the input voltage V1, more than two different voltage levels are available for generating the switch node voltage VA' such that it assumes the desired value. The bridge legs $1_1$ illustrated in FIGS. 7D and 7E are so-called multi-level bridge legs, wherein the bridge leg $1_1$ shown in FIG. 7D is a Hybrid Active Neutral Point Clamped Converter leg, and the bridge leg $1_1$ shown in FIG. 7E is a Stacked Multicell Converter leg. These legs are known (see, for example, G. Gateau, T. A. Meynard, H. Foch: " Stacked Multicell Converter (SMC): Properties and design", 2001 IEEE $32^{nd}$ Annual Power Electronics Specialists Conference, Vol. 3, pages 1583-1588), so that no further explanation is required in this regard. Basically, each of these bridge legs is capable of providing more than three different voltage levels, that is, the three voltage levels VX, VY, VZ and additional voltage levels for generating the switch node voltage VA'.

In the examples illustrated in FIGS. 7A-7F, the rectifier elements may be implemented as diodes (as illustrated). This, however, is only an example. According to another example (not shown) these rectifier elements may be implemented as synchronous rectifier elements.

Referring to the above, operating a power converter of the type illustrated in FIGS. 1 and 3 may include a PWM (pulse-width modulated) operation of each of the at least one electronic switch in each of the bridge legs $1_1$, $1_2$, $1_3$ at each time of the operation. Operating the switches Q1, Q2, Q3 in a PWM mode, however, is associated with switching losses. "Switching losses" are losses that occur in context with switching on and switching off the respective switch Q1, Q2, Q3. In order to increase the efficiency of the power converter it is desirable to reduce those switching losses.

According to one example, reducing switches losses includes operating the power converter in a reduced switching mode, wherein operating the power converter in a reduced switching mode includes deactivating the at least one switch Q1, Q2, Q3 in one or two of the bridge legs $1_1$, $1_2$, $1_3$ for a time period that is significantly longer than the duration T of one drive cycle. According to one example, deactivating the at least one switch includes deactivating the at least one switch for more than 10, more than 100 or even more than 1000 drive cycles. In the following, a bridge leg in which the at least one switch is deactivated is referred to as deactivated bridge leg. Referring to the above, the "at least one electronic switch" of a bridge leg $1_1$, $1_2$, $1_3$ may include one electronic switch or several electronic switches. A bridge leg $1_1$ with one electronic switch is illustrated in FIG. 7A wherein, as illustrated in FIG. 5, one switch may include two transistors. Bridge legs $1_1$ with several (unidirectional blocking) switches are illustrated in FIGS. 7B-7F. In a bridge leg with several switches, "deactivating the at least one switch" includes deactivating each of the several switches. Further, as used herein, "the at least one electronic switch" is a switch that is used in a respective bridge leg to connect the switch node to the midpoint Y or to a circuit node having a voltage between the voltage at the midpoint Y and one of the first and second DC link node voltages VX, VZ. Voltages between the voltage at the midpoint Y and one of the first and second DC link node voltages VX, VZ are provided in the bridge legs illustrated in FIGS. 7E and 7F, for example. Referring to the above, the rectifier elements that couple the switch nodes A', B', C' to the first and second DC link nodes X, Z may include an electronic switch. Thus, "deactivating the at least one switch", does not include deactivating electronic switches acting as (synchronous) rectifiers.

Figure 8:
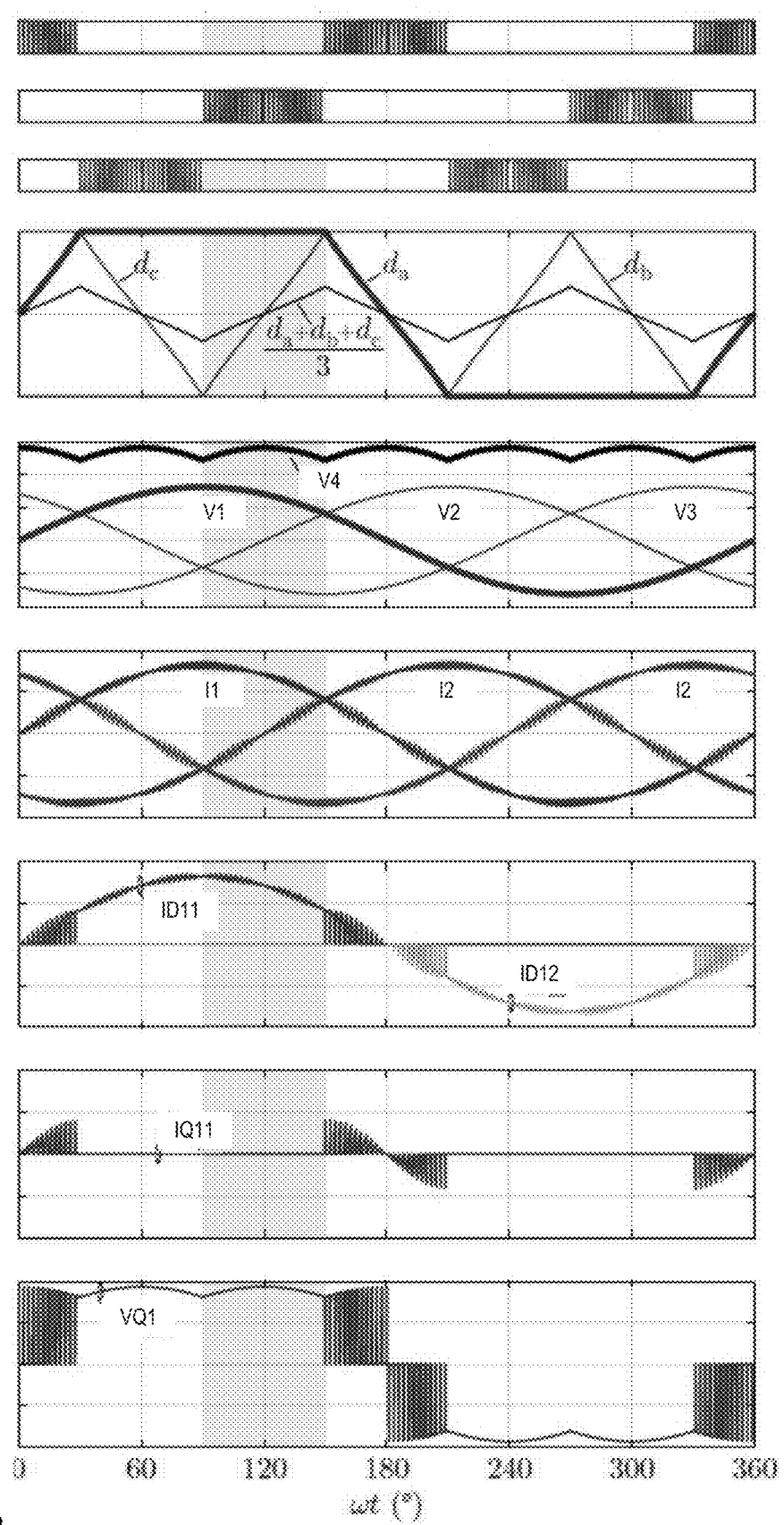
FIG. 8 shows signal diagrams that illustrate operating the power converter in a reduced switching mode (1/3 mode) according to one example.

One example of operating the power converter in a reduced switching mode is illustrated in FIG. 8, wherein FIG. 8 illustrates signal diagrams of the drive signals S1, S2, S3, the input voltages V1, V2, V3, the DC link voltage V4, the input currents I1, I2, I3, the currents ID11, ID12, IQ11 in the first bridge leg $1_1$ and the voltage VQ1 across the first switch Q1 in the first bridge leg $1_1$. The operating mode illustrated in FIG. 8 is referred to as 1/3 mode in the following. In this operating mode, there are time periods in which only one of the three bridge legs $1_1$, $1_2$, $1_3$ is operated in the PWM mode and the other two of the bridge legs $1_1$, $1_2$, $1_3$ are deactivated, that is, the at least one electronic switch Q1, Q2, Q3 in the other two of the bridge legs $1_1$, $1_2$, $1_3$ is switched off. In the following, a bridge leg in which the at least one electronic switch is operated in the PWM mode is referred to as "activated bridge leg", and a bridge leg in which the at least one electronic switch is deactivated is referred to as "deactivated bridge leg", although a current may of course flow in the deactivated bridge leg between the respective switch node and one of the first and second DC link nodes X, Z.

In the example shown in FIG. 8, the power converter is operated in the 1/3 mode throughout the period of the input voltages V1, V2, V3. That is, at each time of the period of the input voltages V1, V2, V3 only one of the bridge legs $1_1$, $1_2$, $1_3$ is activated and the other two bridge legs are deactivated. This type of operating mode is referred to as full 1/3 mode in the following. This, however, is only an example. According to another example explained further below it is also possible to operate the power converter such that only in some time periods (at some phase angles of one period of the input voltages V1, V2, V3) it operates in the 1/3 mode.

Referring to the above, the switch node voltage of a deactivated bridge leg is either clamped to the DC link voltage VX at the first DC link node X or the DC link voltage VZ at the second DC node Z. Thus, in the 1/3 mode, the switch node voltage of one bridge leg is clamped to the first DC link node voltage VX, and the switch node voltage of another bridge leg is clamped to the second DC link node voltage VZ. The bridge legs that are deactivated change over one period of the input voltage system. This is explained with reference to signal diagrams illustrated in FIG. 13 herein further below.

Figure 10:
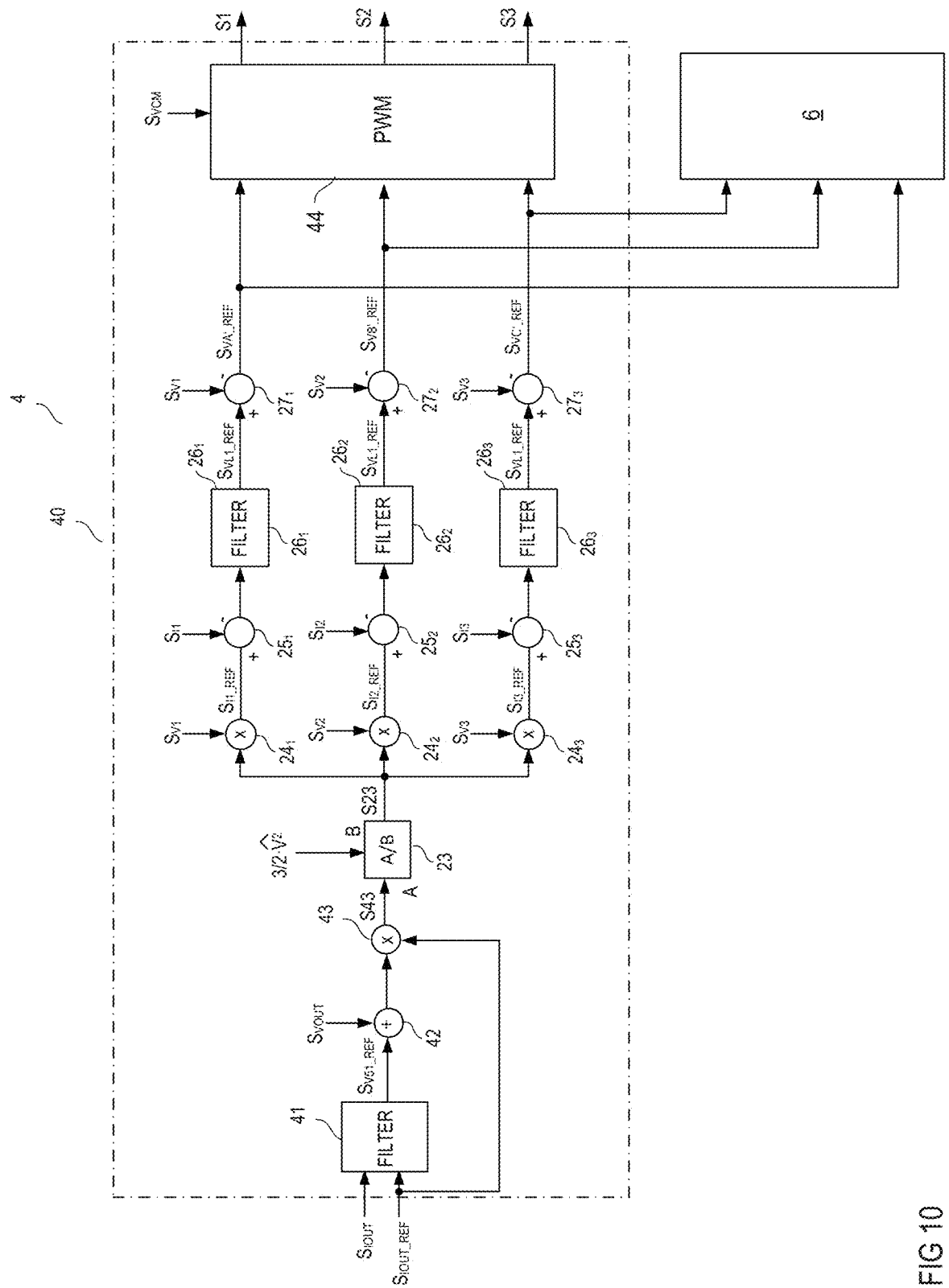
FIG. 10 illustrates one example of a control circuit configured to operate the power converter arrangement such that the first power converter is operated in accordance with the method illustrated in FIGS. 8 and 9.

According to one example, the currents through the two inductors that are connected to the deactivated bridge legs are regulated by suitably regulating the DC link voltage V4 by a further power converter 5 connected to the DC link nodes X, Z of the power converter. A power converter arrangement with a power converter of the type explained before and a further power converter 5 connected to the DC link nodes X, Z of the power converter is illustrated in FIG. 10. The power converter 10 is also referred to as first power converter and the further power converter 5 is also referred to as second power converter in the following. The second power converter 5 may be configured to provide a constant output current $I_{OUT}$ or a constant output voltage $V_{OUT}$ different from the DC link voltage V4. When the second power converter 5 contributes to the regulation of the inductor currents I1, I2, I3 in the first power converter 10 by suitably regulating the DC link voltage V4 there is no increase of the losses occurring in the second power converter 5. The switching losses in the first power converter, however, are significantly reduced. Thus, there is a synergy between the control of the first power converter and the control of the second power converter 5.

Figure 9:
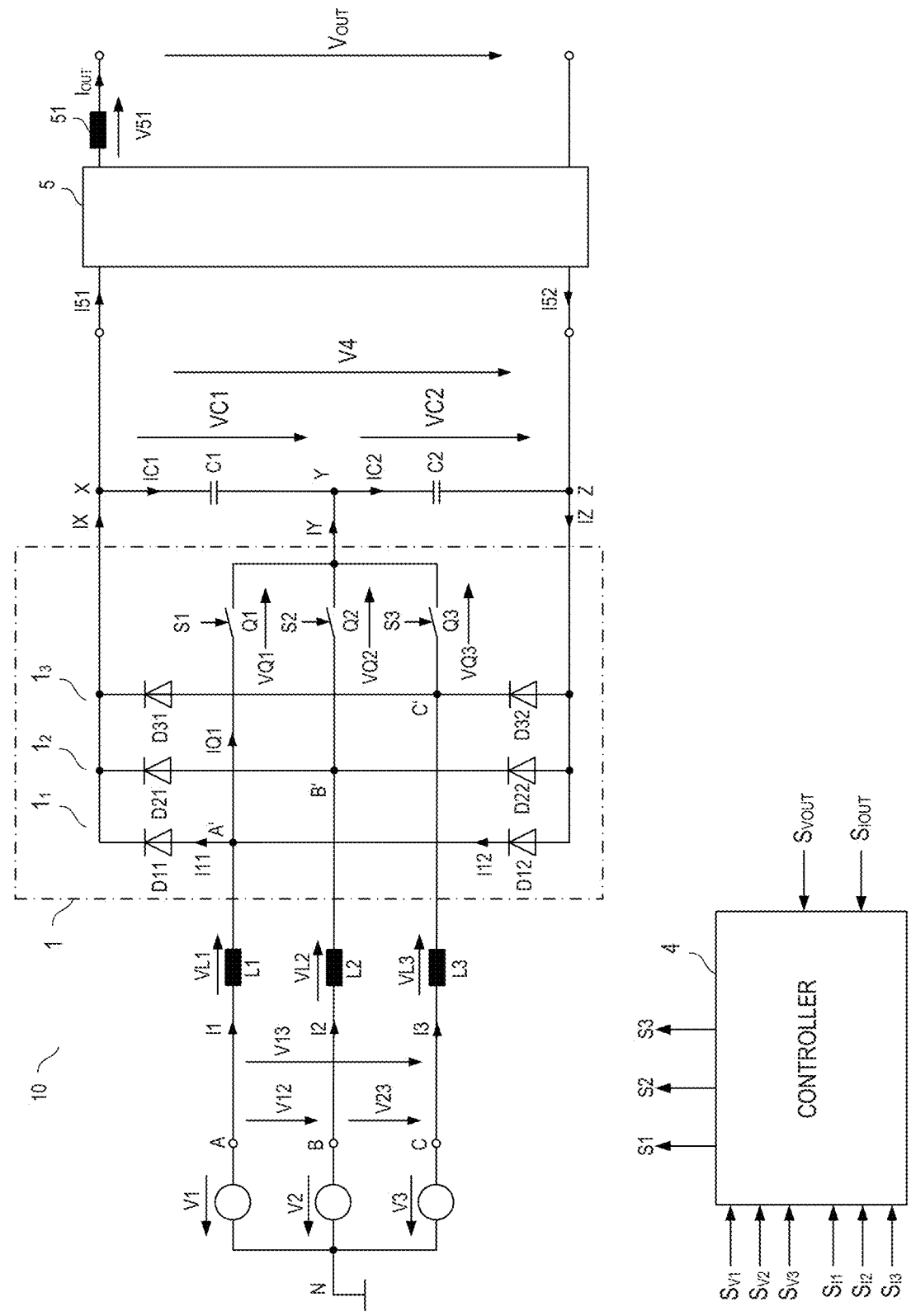
FIG. 9 illustrates a power converter arrangement with a first power converter and a second power converter, wherein the second power converter is operated in accordance with the method illustrated in FIGS. 8 and 9.

One example of a control circuit 4 configured to operate a power converter arrangement with a first power converter and a second power converter of the type shown in FIG. 9 is illustrated in FIG. 10. The control circuit 4 shown in FIG. 10 includes two main branches (or subcircuits), a first branch 40 configured to operate the first power converter and a second branch 6 configured to operate the second power converter 5. It should be noted that the block diagram shown in FIG. 10 illustrates the functional blocks of the control circuit 4 rather than a specific implementation. Those functional blocks can be implemented in various ways. According to one example, these functional blocks are implemented using dedicated circuitry. According to another example, the control circuit 4 is implemented using hardware and software. For example, the first control circuit includes a microcontroller and software executed by the microcontroller.

For the purpose of explanation it is assumed that in the power converter arrangement illustrated in FIG. 10 the output current $I_{OUT}$ of the second power converter 5 is regulated and that the output voltage $V_{OUT}$ is defined by a load (not shown) receiving the output current. The load may be a battery that receives the output current $I_{OUT}$ and defines the output voltage $V_{OUT}$.

The first branch 40 of the control circuit 4 shown in FIG. 10 is based on the control circuit shown in FIG. 6, wherein the same elements have the same reference characters. Referring to FIG. 10, the control circuit 4 receives an output current signal $S_{IOUT}$ wherein the output current signal $S_{IOUT}$ represents the output current $I_{OUT}$. The output current $I_{OUT}$ may be measured in a conventional way by any kind of current measurement circuit (not shown) in order to obtain the output current signal $S_{IOUT}$. The control circuit 4 includes a first filter 41 that receives the output current signal $S_{IOUT}$ and an output current reference signal $S_{IOUT\_REF}$, wherein the an output current reference signal $S_{IOUT\_REF}$ represents the desired current level of the output current $I_{OUT}$. The first filter 41 subtracts the output current reference signal $S_{IOUT\_REF}$ from the output current signal $S_{IOUT}$, for example, and filters the difference in order to generate an output signal $S_{V51\_REF}$. According to one example, this output signal $S_{V51\_REF}$ represents a desired voltage V51 across an inductor 51 in the second power converter 5, wherein this inductor 51 carries the output current $I_{OUT}$. One example of such inductor 51 is illustrated in FIG. 9.

The filter may have one of a proportional (P) characteristic, a proportional-integrative (PI) characteristic, a proportional-integrative-derivative (PID) characteristic, or the like. An adder 42 receives the filter output signal $S_{V51\_REF}$ and an output voltage signal $S_{VOUT}$ that represents the output voltage $V_{OUT}$, wherein an output signal S42 of the adder 42 and the filter output signal $S_{V51\_REF}$ are received by a multiplier. An output signal S43 of the multiplier 43 represents a desired output power of the power converter arrangement. The divider 23 already explained with FIG. 6 divides the multiplier output signal S43 by a signal that represents 1.5 times the square of the amplitude of the input voltages V1, V2, V3 ($3/2 \cdot \hat{V}^2$). An output signal S23 of the divider 23 represents an overall desired input current of the first power converter. The divider output signal S23 is processed by the three branches explained with reference to FIG. 6 before in order to generate the three switch node voltage reference signals $S_{VA'\_REF}$, $S_{VB'\_REF}$, $S_{VC'\_REF}$. It should be noted that the current control loop is the slowest one of the control loops explained in context with FIG. 10.

Controlling the output current $I_{OUT}$ by the control circuit 4 is only an example. According to another example, the output voltage $V_{OUT}$ is controlled. In this example (not shown), the filter 41 receives the output voltage signal $S_{VOUT}$ and an output voltage reference signal $S_{VOUT\_REF}$ representing the desired voltage level of the output voltage $V_{OUT}$. Further, the adder 42 is omitted and the multiplier 43 receives the output signal from the filter 41 and the output voltage reference signal $S_{VOUT\_REF}$.

Referring to FIG. 10, a PWM modulator 44 receives the switch node voltage reference signals $S_{VA'\_REF}$, $S_{VB'\_REF}$, $S_{VC'\_REF}$. From these switch node voltage reference signals $S_{VA'\_REF}$, $S_{VB'\_REF}$, $S_{VC'\_REF}$ the PWM modulator 44 (a) selects a maximum and deactivates the bridge leg associated with the maximum voltage reference signal; (b) selects a minimum and deactivates the bridge leg associated with the minimum voltage reference signal; and (c) operates the remaining bridge leg in the PWM mode. The "remaining bridge leg" is the bridge leg, associated with the switch node reference signal that is between the maximum and the minimum switch node voltage reference signal. This switch node voltage reference signal is referred to as intermediate switch node voltage reference signal in the following.

The second branch 6 of the control circuit also receives the three switch node voltage reference signals $S_{VA'\_REF}$, $S_{VB'\_REF}$, $S_{VC'\_REF}$ and is configured to control operation of the second power converter 5 based on these signals $S_{VA'\_REF}$, $S_{VB'\_REF}$, $S_{VC'\_REF}$. One example of the second branch 6 of the control circuit is explained in detail herein further below.

Figure 11:
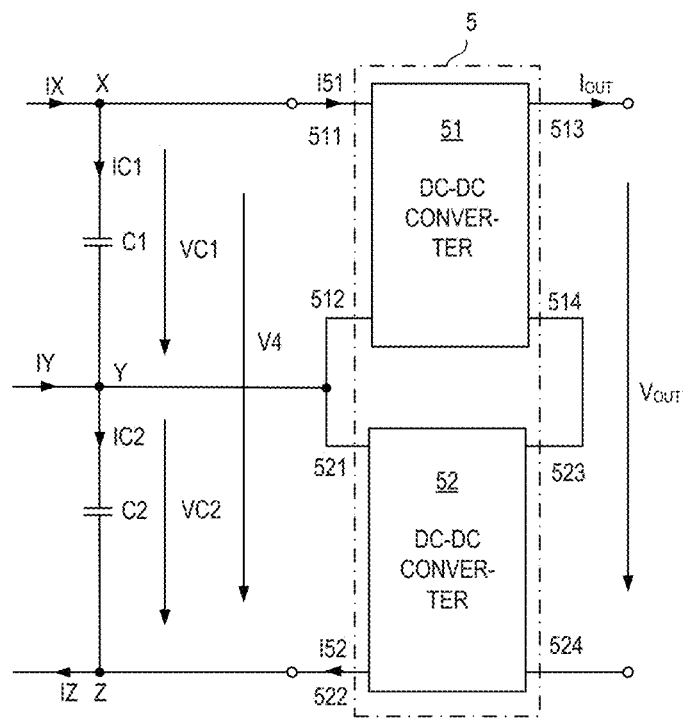
FIG. 11 illustrates an example of a second power converter that includes two converter stages.

FIG. 11 illustrates one example of the second power converter 5. In this example, the second power converter 5 includes a first converter stage 51 and a second converter stage 52, wherein each of these a first and second converter stages 51, 52 includes a first input node 511, 521, a second input node 512, 522, a first output node 513, 523, and a second output node 514, 524. The first input node 511 of the first converter stage 51 may be connected to the first DC link node X, the second input node 522 of the second converter stage 52 may be connected to the second DC link node Z, and the second input node 512 of the first converter stage 51 and the first input node 521 of the second converter stage 52 may be connected with each other and connected to the midpoint Y. Further, the second output node 514 of the first converter stage 51 and the first output node 523 of the second converter stage 52 may be connected with each other. The output voltage $V_{OUT}$ is the voltage between the first output node 513 of the first converter stage 51 and the second output node 524 of the second converter stage 52.

The converter stages 51, 52 may each be implemented with one of various different converter topologies. According to one example, each of the converter stages 51, 52 is implemented as an isolated DC-DC converter, that is, a DC-DC converter that includes a transformer between the respective input 511, 512 or 521, 522 and the respective output 513, 514 or 523, 534. According to another example, each of the converter stages 51, 52 is implemented as a non-isolated DC-DC converter, that is, a DC-DC converter that does not include a transformer between the respective input 511, 512 or 521, 522 and the respective output 513, 514 or 523, 534. Examples of different types of DC-DC converters that are suitable to be used as first and second converter stage 51, 52 include, but are not restricted to: a flyback converter (isolating), an LLC converter (isolating), dual active bridge (DAB) converter (isolating), a phase-shifted full bridge converter (isolating), a buck-boost converter, a boost-buck converter, etc. These types of converters are known, so that no further explanation is required in this regard.

Figure 12:
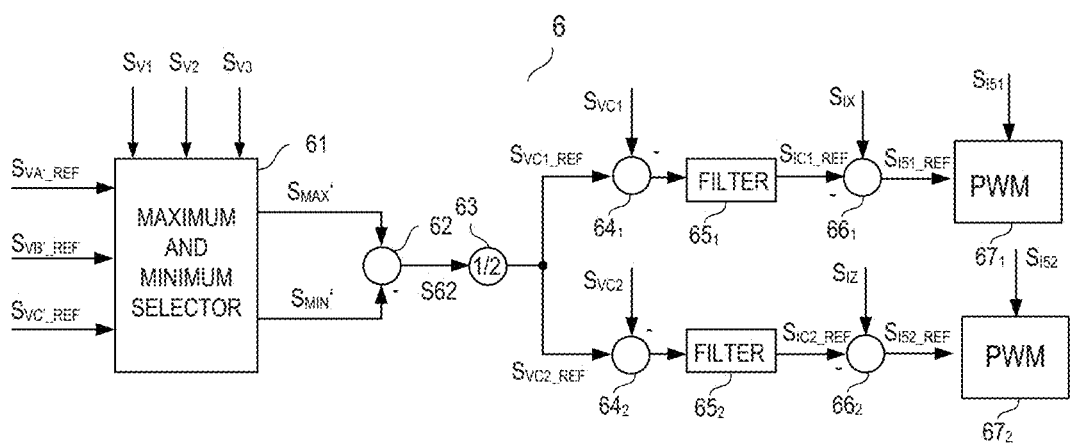
FIG. 12 illustrates one example of a control circuit configured to operate the second power converter according to FIG. 11.

One example of the second converter branch 6 configured to control operation of a second power converter 5 of the type shown in FIG. 11 is illustrated in FIG. 12. This control circuit 6 includes a maximum and minimum selector 61 that receives the three switch node voltage reference signals $S_{VA'\_REF}$, $S_{VB'\_REF}$, $S_{VC'\_REF}$. This maximum and minimum selector 61 is configured to select the maximum of switch node voltage reference signals $S_{VA'\_REF}$, $S_{VB'\_REF}$, $S_{VC'\_REF}$ and the minimum of the switch node voltage reference signals $S_{VA'\_REF}$, $S_{VB'\_REF}$, $S_{VC'\_REF}$ and output a first signal $S_{MAX}'$ that equals the maximum of the switch node voltage reference signals $S_{VA'\_REF}$, $S_{VB'\_REF}$, $S_{VC'\_REF}$, and a second signal $S_{MIN}'$ that equals the minimum of the switch node voltage reference signals $S_{VA'\_REF}$, $S_{VB'\_REF}$, $S_{VC'\_REF}$, so that $S_{MAX}'=\max\{S_{VA'\_REF}, S_{VB'REF}, S_{VC'\_REF}\}$ and $S_{MIN}'=\max\{S_{VA'\_REF}, S_{VB'REF}, S_{VC'\_REF}\}$. The first signal $S_{MAX}'$ is also referred to as maximum switch node voltage reference signal $S_{MAX}'$, and the second signal $S_{MIN}'$ is also referred to as minimum switch node voltage reference signal. The intermediate switch node voltage reference signal is also referred to as $S_{INT}'$ in the following.

The second control circuit branch 6 is configured to operate the second power converter 5 in such a way that the DC link voltage V4 equals a voltage that is represented by the difference between the maximum switch node voltage reference signal $S_{MAX}'$ and the minimum switch node voltage reference signal $S_{MIN}'$. Referring to the above, the switch nodes of the bridge legs that are deactivated are clamped to the first DC link node voltage VX and the second DC link node voltage VZ, respectively. By adjusting the DC link voltage V4 such that it equals a voltage represented by the difference between the maximum switch node voltage reference signal $S_{MAX}'$ and the minimum switch node voltage reference signal $S_{MIN}'$ the switch nodes that are clamped to the first and second DC link nodes X, Z receive the switch node voltages calculated by the first control circuit branch 40. Thus, the inductor currents of those inductors connected to deactivated bridge legs have a current level as represented by the respective input current reference signal calculated by the first control circuit branch 40.

Referring to FIG. 12, the second control circuit branch 6 includes a subtractor 62 that subtracts the minimum switch node voltage reference signal $S_{MIN}'$ from the maximum switch node voltage reference signal $S_{MAX}'$, wherein a multiplier 63 multiplies an output signal of the subtractor with 0.5. An output signal of the multiplier forms a first capacitor voltage reference signal $S_{VC1\_REF}$ and a second capacitor voltage reference signal $S_{VC2\_REF}$, wherein the first capacitor voltage reference signal $S_{VC1\_REF}$ represents a desired value of the first capacitor voltage VC1, and the second capacitor voltage reference signal $S_{VC2\_REF}$ represents a desired value of the second capacitor voltage VC2. The second control circuit branch 6 includes a first branch and a second branch. The first branch receives the first capacitor voltage reference signal $S_{VC1\_REF}$ and is configured to provide a first input current reference signal $S_{I51\_REF}$, wherein the first input current reference signal $S_{I51\_REF}$ represents a desired input current 151 of the first converter stage 51. The second branch receives the second capacitor voltage reference signal $S_{VC2\_REF}$ and is configured to provide a second input current reference signal $S_{I52\_REF}$, wherein the second input current reference signal $S_{I52\_REF}$ represents a desired input current 152 of the second converter stage 52.

The first branch includes a subtractor 641 that subtracts a first capacitor voltage signal $S_{CV1}$, which represents the first capacitor voltage VC1, from the first capacitor voltage reference signal $S_{VC1\_REF}$. An output signal of the subtractor is filtered by a filter 651, wherein an output signal $S_{IC1\_REF}$ of the filter represents a desired current level of a current into the first capacitor C1. The first input current reference signal $S_{I51\_REF}$ is given by a difference between a current signal $S_{IX}$ that represents a current into the first DC link node X (wherein this current IX is provided by the first power converter) and the filter output signal $S_{IC1\_REF}$.

The second branch includes a subtractor $64_2$ that subtracts a second capacitor voltage signal $S_{CV2}$, which represents the second capacitor voltage VC2, from the second capacitor voltage reference signal $S_{VC2\_REF}$. An output signal of the subtractor is filtered by a filter 652, wherein an output signal $S_{IC2\_REF}$ of the filter represents a desired current level of a current into the second capacitor C2. The second input current reference signal $S_{I52\_REF}$ is given by a difference between a current signal $S_{IZ}$ that represents a current into the second DC link node Z (wherein this current IZ is provided by the first power converter) and the filter output signal $S_{IC2\_REF}$.

Referring to FIG. 12, a first PWM modulator $67_1$ receives the first input current reference signal $S_{I51\_REF}$ and a first input current signal $S_{I51}$, wherein the latter represents the first input current I51, and is configured to control operation of one or more switches (not shown in the figures) included in the first converter stage 51 such that the first input current I51 has a current level as represented by the first input current reference signal $S_{I51\_REF}$. Equivalently, a second PWM modulator $67_1$ receives the second input current reference signal $S_{I52\_REF}$ and a second input current signal $S_{I52}$, wherein the latter represents the second input current I52, and is configured to control operation of one or more switches (not shown in the figures) included in the second converter stage 52 (not shown in the figures) such that the first input current I51 has a current level as represented by the first input current reference signal $S_{I51\_REF}$. The specific implementation of the PWM modulators $67_1$, $67_2$ is dependent on the specific type of power converter used to implement the first and second converter stages 51, 52. However, PWM modulators configured to control the input current in various kinds of DC-DC converters are known, so that no further explanations are required in this regard.

Referring to the above, activating one of the three bridge legs $1_1$, $1_2$, $1_3$ and deactivating the two other bridge legs $1_1$, $1_2$, $1_3$ by the PWM modulator 44 in the 1/3 mode is dependent on the switch node voltage reference signals $S_{VA'\_REF}$, $S_{VB'\_REF}$, $S_{VC'\_REF}$. Time instances at which two of these switch node voltage reference signals $S_{VA'\_REF}$, $S_{VB'\_REF}$, $S_{VC'\_REF}$ are equal can be neglected, so that at each time, from these switch node voltage reference signals $S_{VA'\_REF}$, $S_{VB'\_REF}$, $S_{VC'\_REF}$, one forms the maximum switch node voltage reference signal $S_{MAX}'$, one forms the intermediate switch node voltage reference signal $S_{INT}'$, and one forms the minimum switch node voltage reference signal $S_{MIN}'$. This is explained with reference to FIG. 13 in greater detail.

Figure 13:
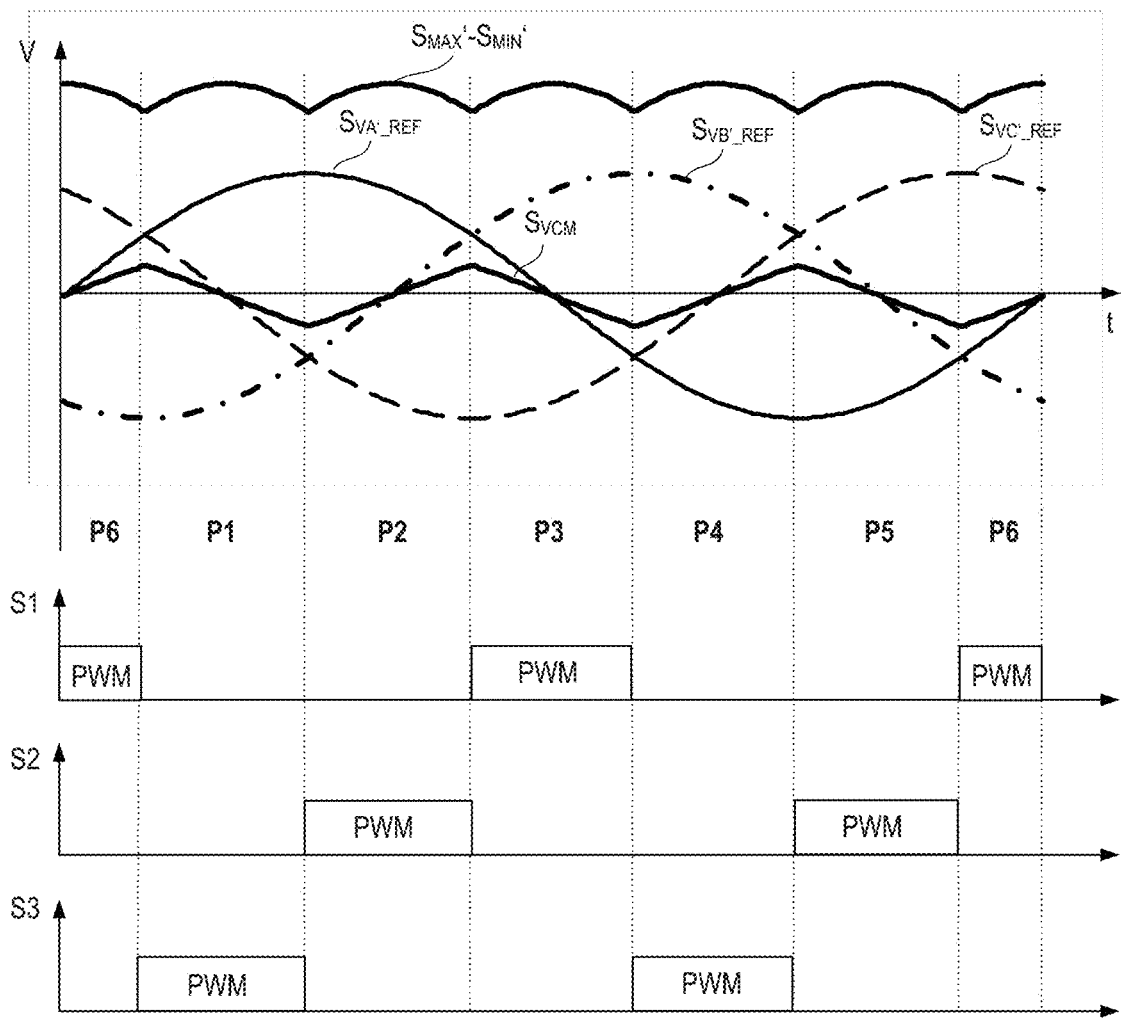
FIG. 13 show signal diagrams that illustrate operating the power converter in the reduced switching mode illustrated in FIG. 9 in greater detail.

FIG. 13 illustrates signal diagrams of switch node voltage reference signals $S_{VA'\_REF}$, $S_{VB'\_REF}$, $S_{VC'\_REF}$, wherein each of these signals represents the desired voltage value of the respective switch node voltage VA', VB', VC'. FIG. 13 further illustrates which of the bridge legs is operated in the PWM mode at which time or phase angle. Referring to the above and as illustrated in FIG. 13, in the steady state, each of the switch node voltage reference signals $S_{VA'\_REF}$, $S_{VB'\_REF}$, $S_{VC'\_REF}$ follows the respective input voltage.

Referring to FIG. 13, a relationship between the individual switch node voltage reference signals $S_{VA'\_REF}$, $S_{VB'\_REF}$, $S_{VC'\_REF}$ changes several times within one period. The "relationship" means the signal level of one of the switch node voltage reference signals $S_{VA'\_REF}$, $S_{VB'\_REF}$, $S_{VC'\_REF}$ relative to the signal levels of the other two of the switch node voltage reference signals $S_{VA'\_REF}$, $SV_{B'\_REF}$, $S_{VC'\_REF}$. In the example illustrated in FIG. 13, there are six time periods P1-P6, which are also referred to as operating phases in the following, wherein in each of these time periods P1-P6 the relationship between the switch node voltage reference signals $S_{VA'\_REF}$, $S_{VB'\_REF}$, $S_{VC'\_REF}$ does not change. (The signal levels of the switch node voltage reference signals $S_{VA'\_REF}$, $S_{VB'\_REF}$, $S_{VC'\_REF}$, however, vary in the individual operating phases P1-P6.)

In a first operating phase P1, for example, the first switch node voltage reference signal $S_{VA'\_REF}$ has the highest voltage level. That is, the voltage level of the first switch node voltage reference signal $S_{VA'\_REF}$ is higher than the voltage level of a second one $S_{VB'\_REF}$ of the switch node voltage reference signals $S_{VA'\_REF}$, $S_{VB'\_REF}$, $S_{VC'\_REF}$ and the signal level of a third one $S_{VC'\_REF}$ of the switch node voltage reference signals $S_{VA'\_REF}$, $S_{VB'\_REF}$, $S_{VC'\_REF}$. Further, in the first operating phase P1, the second switch node voltage reference signal $S_{VB'\_REF}$ V2 hast the lowest voltage level. That is, the voltage level of the second switch node voltage reference signal $S_{VB'\_REF}$ is lower than the signal level of the first switch node voltage reference signal $S_{VA'\_REF}$ and the signal level of the third switch node voltage reference signal $S_{VC'\_REF}$. Further, the third switch node voltage reference signals $S_{VA'\_REF}$, $S_{VB'\_REF}$, $S_{VC'\_REF}$ has a signal level between the voltage level of the first switch node voltage reference signal $S_{VA'\_REF}$ and the signal level of the second switch node voltage reference signal $S_{VB'\_REF}$. Thus, in the first operating phase P1, the first switch node voltage reference signal $S_{VA'\_REF}$ is the maximum switch node voltage reference signal $S_{MAX}'$, the second switch node voltage reference signal $S_{VB'\_REF}$ is the minimum switch node voltage reference signal $S_{MIN}'$, and the third switch node voltage reference signal $S_{VC'\_REF}$ is the intermediate switch node voltage reference signal $S_{INT\_REF}$. In the second operating phase P2, for example, the first switch node voltage reference signal $S_{VA'\_REF}$ is the maximum switch node voltage reference signal $S_{MAX}'$, the second switch node voltage reference signal $S_{VB'\_REF}$ is the intermediate switch node voltage reference signal $S_{INT}'$, and the third switch node voltage reference signal $S_{VC'\_REF}$ is the minimum switch node voltage reference signal $S_{MIN'REF}$.

In the following, the input voltage having the highest voltage level is referred to as maximum input voltage Vmax, the input voltage having the lowest voltage level is referred to as minimum input voltage Vmin, and the input voltage having a voltage level between the highest voltage level and the lowest voltage level is referred to as intermediate input voltage $V_{INT}$. The line-to-line voltage $V_{LL}$ explained above is then given by $V_{LL}$=Vmax−Vmin. Referring to the above, the switch node voltage reference signals $S_{VA'\_REF}$, $S_{VB'\_REF}$, $S_{VC'\_REF}$, in the steady state, essentially follow the input voltages V1, V2, V3, so that the output signal $S_{MAX}'$−$S_{MIN}'$ of the subtractor 62 shown in FIG. 12 essentially represents the line-to-line voltage $V_{LL}$. The subtractor output signal $S_{MAX}'$−$S_{MIN}'$ is also illustrated in FIG. 13.

Referring to FIG. 13, operating the power converter in the 1/3 mode includes activating the bridge leg associated with the intermediate voltage reference signal $S_{INT}'$ and deactivating the bridge legs associated with the maximum switch node voltage reference signal $S_{MAX}'$ and the minimum switch node voltage reference signal $S_{MIN}'$. That is, in the first operating phase P1, for example, the third bridge leg 13 is activated, in the second operating phase P2 the second bridge leg $1_2$ is activated, and so on.

Referring to the above, the bridge legs $1_1$, $1_2$, $1_3$ are activated and deactivated by the PWM modulator 44 in the control circuit 4. According to one example, the PWM circuit 44 is configured to calculate the duty cycles d1, d2, d3 based on $$d1 = \frac{VA' + VCM}{V4/2} \quad (4a)$$

$$d2 = \frac{VB' + VCM}{V4/2} \quad (4b)$$

$$d3 = \frac{VC' + VCM}{V4/2}, \quad (4c)$$

which is based on equation (3c). Further, in the 1/3 mode, the common mode voltage $V_{CM}$ represented by the common mode signal $S_{VCM}$ received by the PWM modulator is selected such that $$V_{CM} = -\frac{Vmax' + Vmin'}{2}. \quad (5)$$

A common mode voltage signal $S_{VCM}$ representing this common mode voltage $V_{CM}$ is also illustrated in FIG. 13 over one period of the input voltages. When adjusting the duty cycles d1, d2, d3 in accordance with equations (4a)-(4c) and (5) the duty cycle of the bridge leg associated with the maximum switch node voltage reference signal $S_{MAX}'$ is "automatically" set to +1 throughout the respective operating phase, so that the respective switch node is clamped to VX. Further, the duty cycle of the bridge leg associated with the minimum switch node voltage reference signal $S_{MIN}'$ is "automatically" set to −1 throughout the respective operating phase, so that the respective switch node is clamped to VZ. This is explained in the following.

In the following, dmax denotes the duty cycle of the bridge leg associated with the maximum switch node voltage reference signal $S_{MAX}'$ in a respective operating phase, and dmin denotes the duty cycle of the bridge leg associated with the minimum switch node voltage reference signal $S_{MIN}'$ in a respective operating phase. Further, $V_{MAX}'$ denotes the desired switch node voltage represented by the maximum switch node voltage reference signal $S_{MAX}'$, and Vmin' denotes the desired switch node voltage represented by the minimum switch node voltage reference signal $S_{MIN}'$. Based on one of equations (4a)-(4c) and equation (5) and considering that the DC link voltage V4 is adjusted such that V4=Vmax'−Vmin', the duty cycle dmax and the duty cycle dmin are given by $$dmax = \frac{Vmax' + VCM}{(Vmax' - Vmin')/2} = \frac{Vmax' - (Vmax' + Vmin')/2}{(Vmax' - Vmin')/2} = +1 \quad (6a)$$

$$dmin = \frac{Vmin' + VCM}{(Vmax' - Vmin')/2} = \frac{Vmin' - (Vmax' + Vmin')/2}{(Vmax' - Vmin')/2} = -1. \quad (6b)$$

Referring to the above, when the first power converter 10 is operated in the 1/3 mode, the DC link voltage V4 is adjusted by the second converter 5 such that it equals Vmax'−Vmin', wherein Vmax' is the maximum of the desired switch node voltages and Vmin' is the minimum of the desired switch node voltages. In the steady state, these desired switch node voltages Vmax', Vmin' essentially equal the maximum input voltage Vmax and the minimum input voltage Vmin, respectively, so that the varying DC link voltage V4 essentially equals the line-to-line voltage $V_{LL}$. This is the lowest possible DC link voltage at which sinusoidal input currents I1, I2, I3 can be achieved, wherein the common mode voltage $V_{CM}$ is different from zero and given by equation (5) in this case.

Figure 14:
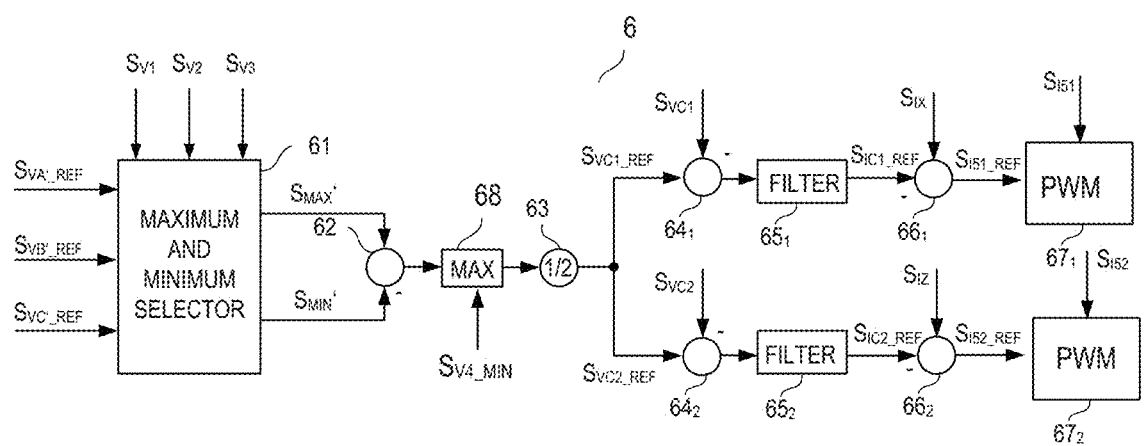
FIG. 14 illustrates a modification of the control circuit shown in FIG. 13.

The power converter arrangement illustrated in FIG. 9 is not restricted to generate the DC link voltage V4 such that it is defined by $S_{MAX}'-S_{MIN}'$ and essentially equals the line-to-line voltage $V_{LL}$. FIG. 14 illustrates one example of a second control circuit branch 6 that is configured to generate the DC link voltage V4 such that in some time periods it is defined by the subtractor output signal S62 ($=S_{MAX}'-S_{MIN}'$) and in some time periods is higher than defined by the subtractor output signal S62. In this example, a maximum selector 68 receives the subtractor output signal S62 and a minimum DC link voltage signal $S_{V4\_MIN}$, wherein the minimum DC link voltage signal $S_{V4\_MIN}$ represents the minimum of the DC link voltage V4 that should be generated at the output of the first power converter 10. The maximum selector outputs the maximum of the two signal it receives to the multiplier 63. The voltage represented by the minimum DC link voltage signal $S_{V4\_MIN}$ is referred to as minimum desired DC link voltage $V4_{MIN}$ in the following.

Figure 15:
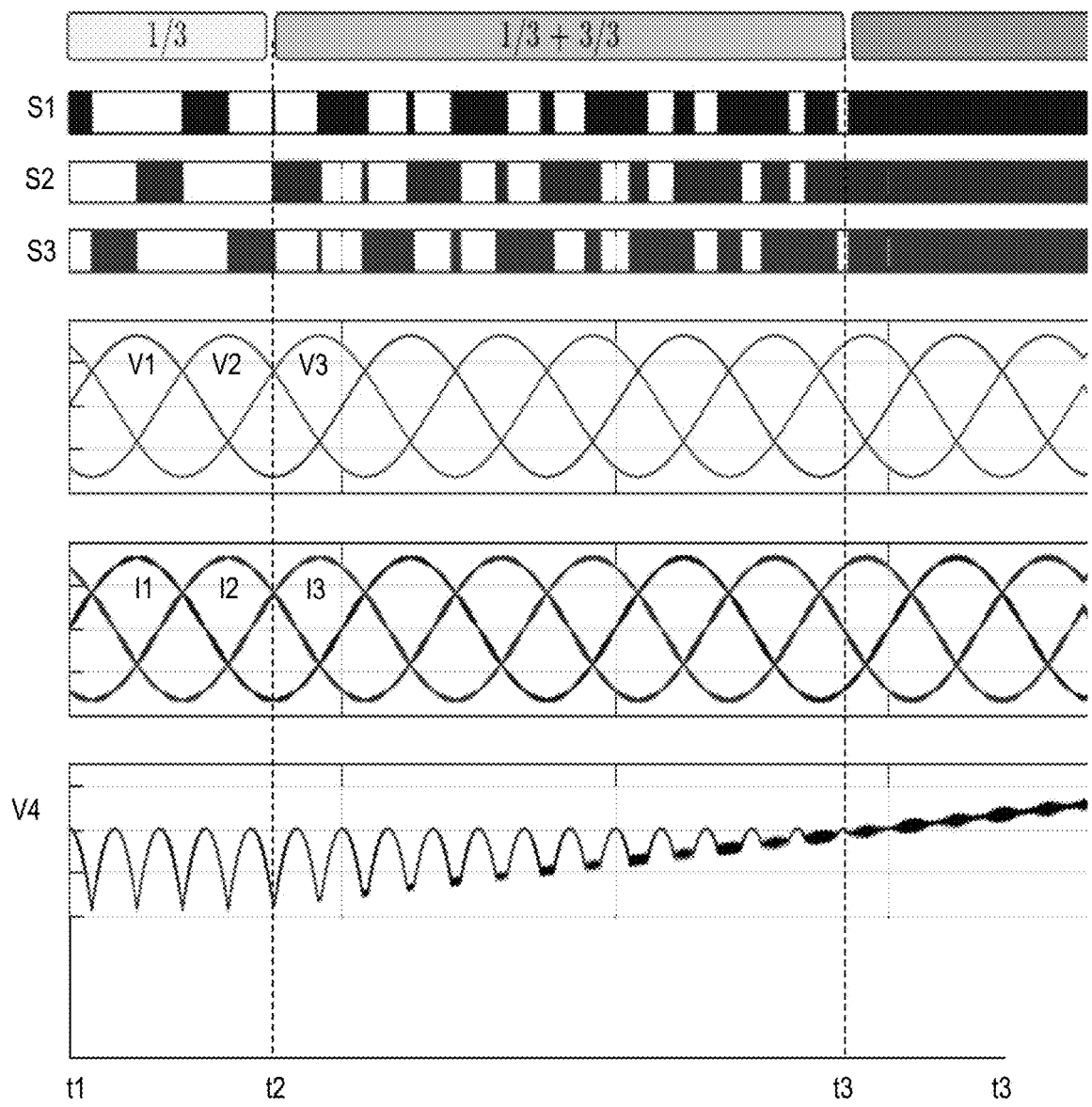
FIG. 15 shows signal diagrams that illustrate operating the power converter arrangement shown in FIG. 10 in a full 1/3 mode, a partial boost mode and a full 3/3 mode.

When the minimum desired DC link voltage $V4_{MIN}$ is the minimum of the subtractor output signal S62 or below, the DC link voltage is generated as explained above and the first power converter 10 is operated in the full 1/3 mode, that is, the power converter operates in the 1/3 mode throughout each of the six operating phases. This type of operating mode is again illustrated in FIG. 15, wherein FIG. 15 illustrates operating the power converter in the full 1/3 mode between a first time instance t1 and a second time instance t2.

When the minimum desired DC link voltage signal $S_{V4\_MIN}$ is higher than a minimum of the subtractor output signal S62, the DC link voltage V4 is generated such that it is generated based on the subtractor output signal S62 in time periods in which the subtractor output signal S62 is higher than the minimum desired DC link voltage signal $S_{V4\_MIN}$. In the remainder of the time the DC link voltage V4 is generated based on the minimum desired DC link voltage signal $S_{V4\_MIN}$. In this type of operation, the power converter is not operated in the 1/3 mode throughout each of the six operating phases anymore. Instead there are time periods in which the first power converter is operated in the 1/3 mode, but also time periods in which each of the bridge legs $1_1$, $1_2$, $1_3$ operate in the PWM mode. This is illustrated between a second time instance t2 and a third time instance t3 in FIG. 15.

Between these time instances t2, t3 the minimum desired DC link voltage increases $V4_{MIN}$ in order to illustrate how operation of the power converter changes dependent on the desired DC link voltage $V4_{MIN}$. The minimum desired DC link voltage $V4_{MIN}$ is the minimum of the DC link voltage V4, which is also illustrated in FIG. 15. Basically, as can be seen from FIG. 15, the duration in which the power converter operates in the 1/3 mode during one period of the input voltages V1, V2, V3 decreases as the minimum DC link voltage $V4_{MIN}$ increases. The operating mode in which the power converter alternatingly operates in the 1/3 mode and the 3/3 mode (as illustrated between time instances t2 and t3 in FIG. 15) is referred to as partial-boost mode in the following.

When calculating the duty cycles d1, d2, d3 in accordance with equations (4a)-(4c), the power converter automatically changes between the 1/3 mode and the 3/3, because these duty cycles are dependent on the DC link voltage V4 that is adjusted by the second power converter 5. In the partial-boost mode, the common mode voltage $V_{CM}$ may be the same as in the full 1/3 mode. However, in those time periods in which the power converter, in the partial-boost mode, operates in the 3/3 mode the common mode voltage $V_{CM}$ may be different from the common mode voltage in the 1/3 mode. Only in the full 1/3 mode, the common mode voltage VCM is constrained to the value presented in equation (5).

In the partial-boost mode and the full-boost mode, however, there is a degree of freedom to adjust the common mode voltage VCM such that it is different from the value given in equation (5). In these operating modes, the degree of freedom that is available to adjust the common mode voltage VCM may be used to adjust the common mode voltage VCM such that a current IY into the midpoint is minimized. This is explained in detail herein further below.

Figure 16:
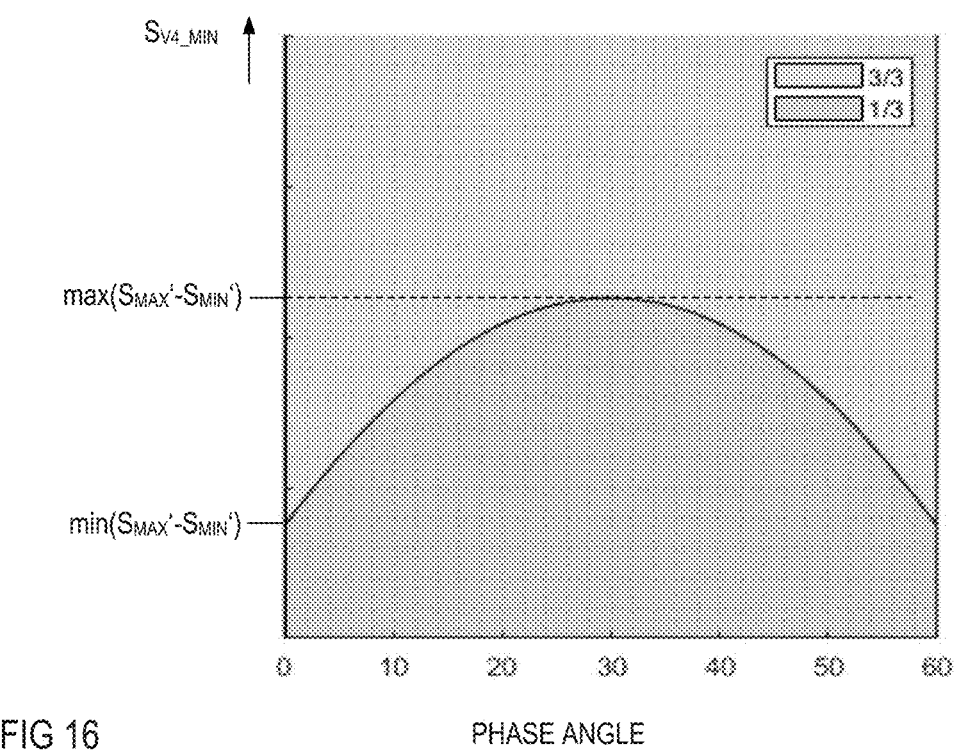
FIG. 16 illustrates the different operating modes shown in FIG. 15 dependent on a desired DC link voltage during one of six operating phases.

FIG. 16 illustrates the different operating modes of the first power converter 10 dependent on the minimum desired DC link voltage signal $S_{V4\_MIN}$ and the phase angle of the input voltages V1, V2, V3. More specifically, FIG. 16 illustrates the different operating modes in an arbitrary one of the six operating phases P1-P6, wherein each of these operating phases covers 60° of one period of the input voltages V1, V2, V3. In FIG. 16, a phase angle of 0° represents the beginning of the respective operating phase, a phase angle of 60° represents the end of the respective operating phase, and a phase angle of 30° represents the middle of the respective operating phase, which is when the intermediate input voltage in the respective operating phase crosses zero.

Referring to FIG. 16, the power converter operates in the full 1/3 mode when the minimum desired DC link voltage signal $S_{V4\_MIN}$ is below a minimum of the subtractor output signal S62. Referring to the above, in the steady state, the subtractor output signal S62 essentially represents the line-to-line voltage $V_{LL}$, so that the power converter operates in the full 1/3 mode when the minimum desired DC link voltage $V4_{MIN}$ is below the minimum line-to-line voltage $V_{LL\_MIN}$.

Further, referring to FIG. 16, the power converter operates in the partial-boost mode when the minimum desired DC link voltage signal $S_{V4\_MIN}$ is between the minimum of the subtractor output signal S62 and a maximum of the subtractor output signal S62. In the steady state, the maximum of the subtractor output signal S62 essentially equals the maximum line-to-line voltage $V_{LL\_MAX}$, so that the power converter operates in the in the partial-boost mode when the DC link voltage V4 is between the minimum line-to-line voltage $V_{LL\_MIN}$ and the maximum line-to-line voltage $V_{LL\_MAX}$. In the partial-boost mode, the portion of the operating phase in which the power converter operates in the 3/3 mode increases as the minimum desired DC link voltage $V4_{MIN}$ increases and the portion of the operating phase in which the power converter operates in the 1/3 mode decreases as the minimum desired DC link voltage $V4_{MIN}$ increases.

Referring to FIG. 16, the power converter operates in the full 3/3 mode when the minimum desired DC link voltage signal $S_{V4\_MIN}$ is higher than the maximum of the subtractor output signal S62. In this operating mode, the DC link voltage V4 is essentially constant and only dependent on the minimum desired DC link voltage signal $S_{V4\_MIN}$.

In the control circuits illustrated in FIGS. 12 and 14, the input currents I51, I52 are controlled such that each of the first and second capacitor voltages VC1, VC2 equals 50% of the desired DC link voltage V4. This, however, is only an example. According to another example illustrated in FIG. 17, the input currents I51, I52 are controlled such that the first capacitor voltage equals k1 times the desired DC link voltage V4, and the second capacitor voltage equals k2 times the desired DC link voltage V4, wherein k1+k2=1, k1>0, k2>0. In this case, the first and second capacitor voltages VC1 and VC2 are different. In this case, the duty cycles d1, d2, d3 may be calculated based on equations (3a) and (3b) by the PWM modulator 44 in the control circuit 4. Optionally, the second control circuit branch 6 may include a maximum selector of the type explained with reference to FIG. 14.

Figure 17:
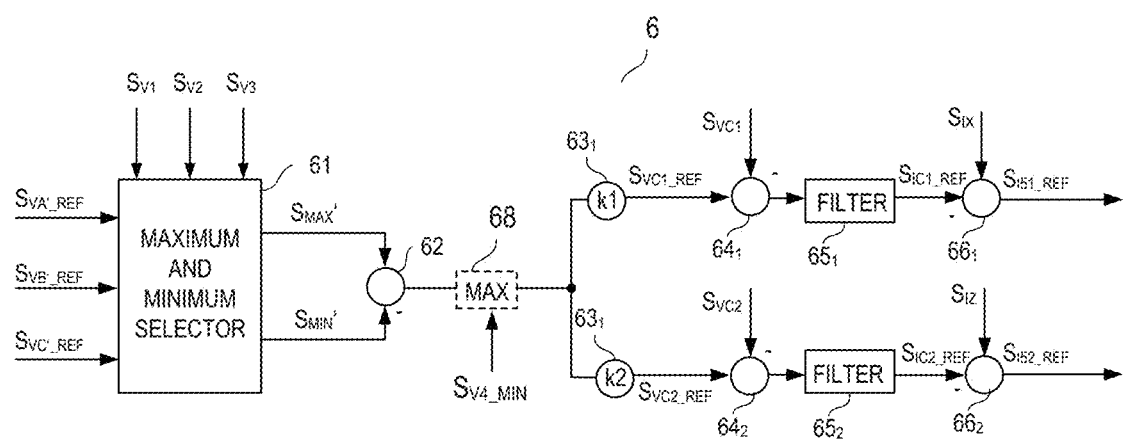
FIG. 17 illustrates another example of a control circuit configured to operate the second power converter according to FIG. 11.
Figure 18:
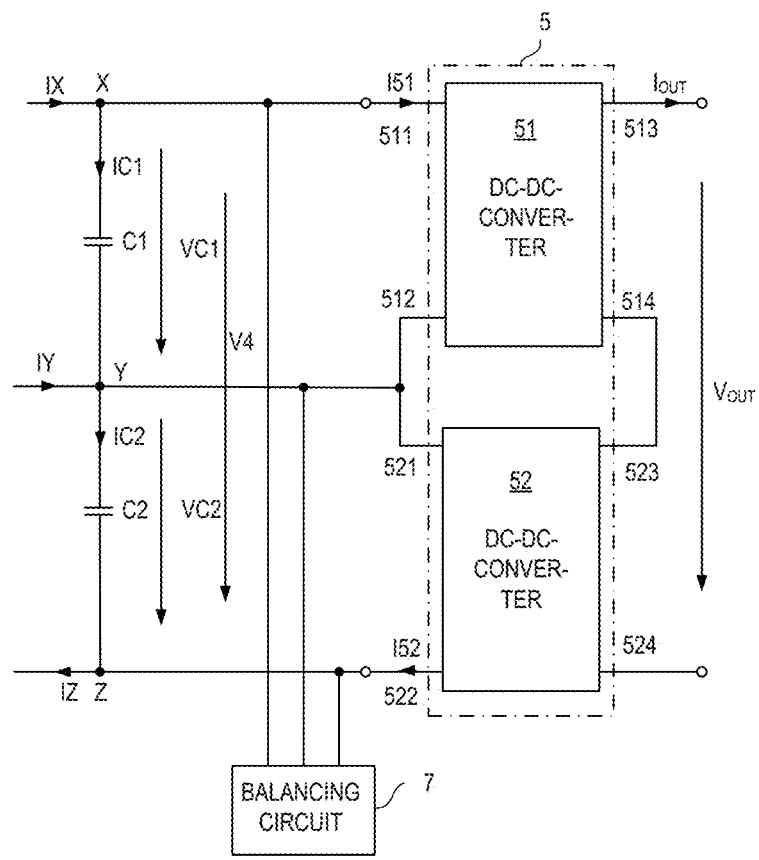
FIG. 18 illustrates an example of a power converter arrangement that includes a balancing circuit.
Figure 19:
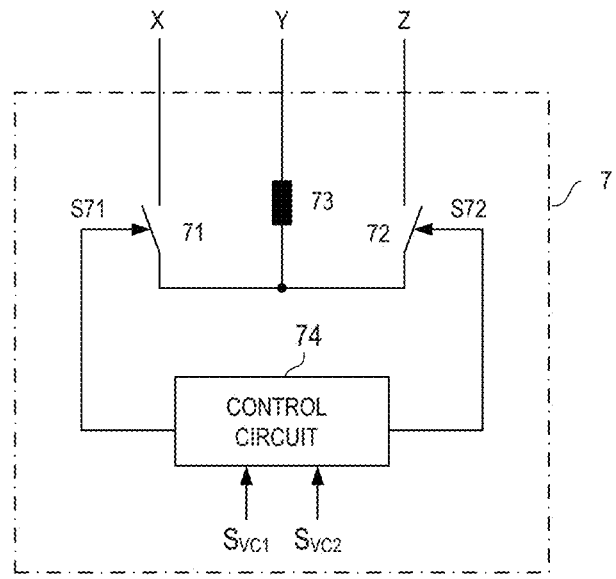
FIG. 19 illustrates one example of the balancing circuit.

In the examples illustrated in FIGS. 12, 14 and 17, the first and second converter stages 51, 52 do not only regulate the DC link voltage V4, but do also regulate the first and second capacitor voltages VC1, VC2. According to another example illustrated in FIG. 18, a balancing circuit 7 regulates a ratio between the first capacitor voltage VC1 and the second capacitor voltage VC2. In this case, the first and second converter stages 51, 52 only regulate the DC link voltage V4. Moreover, in this case, the two converter stages 51, 52 may be replaced by one converter stage Referring to FIG. 19, the balancing circuit may include a first switch 71 connected between the first DC link node X and an inductor 73 connected to the midpoint Y, and second switch 72 connected between the second DC link node Z and the inductor 73. A control circuit 74 receives the first capacitor voltage signal $S_{VC1}$ and the second capacitor voltage signal $S_{VC2}$ and is configured to control operation of the first and second switches 7, 72 in such a way that there is a predefined ratio, such as 1:1 or k1:k2, between these voltages VC1, VC2. By suitably switching the first and second switches 71, 72 energy can be transferred between the first and second DC link capacitor C1, C2. When, for example, the first switch switches on (while the second switch 72 is switched off) energy is taken from the first DC link capacitor C1, stored in the inductor 73, and transferred to the second DC link capacitor C2 when the first switch switches off and the second switch 72 switches on. A duty cycle of operating the two switches 71, 72 defines a ratio between the capacitor voltages VC1, VC2, wherein the capacitor voltages VC1, VC2 are essentially equal when a duty cycle of the two switches 71, 72 is 50%.

Referring to the above, in the power converter arrangement shown in FIG. 10, the DC link voltage is adjusted by the second power converter 5, wherein an output voltage $V_{OUT}$ of the second power converter may be defined by a load, such as battery that is charged by the power converter arrangement. Further, the DC link voltage V4 may be adjusted by the minimum DC link voltage signal $S_{V4\_MIN}$ explained above. Adjusting the DC link voltage V4 may be helpful in order to achieve a high converter efficiency of the second power converter. Basically, the lower a difference between an input voltage and an output voltage of a power converter, the higher the efficiency. Thus, according to one example, the minimum DC link voltage signal $S_{V4\_MIN}$ may be adjusted based on the output voltage $V_{OUT}$ such that the minimum desired DC link voltage $V4_{MIN}$ increases as the output voltage $V_{OUT}$ increases.

Another example of reduced switching mode is referred to as 2/3+PWM mode and is explained in the following. In this type of operating mode, the power converter 10 either operates in a 2/3 mode in which one of the bridge legs $1_1$, $1_2$, $1_3$ is deactivated and the other two of the bridge legs $1_1$, $1_2$, $1_3$ are activated and an 3/3 mode (PWM mode) in which each of the bridge legs $1_1$, $1_2$, $1_3$ is activated. Basically, in a power converter 10 of the type illustrated in FIGS. 1 and 3, the sum of the input currents I1, I2, I3 is zero, that is I1+I2+I3=0. Thus, by regulating two of the three input currents I1, I2, I3 the third one of the three input currents I1, I2, I3 is automatically regulated. Thus, the power converter may be operated in such a way that at each time one of the bridge legs $1_1$, $1_2$, $1_3$ is deactivated. The bridge legs $1_1$, $1_2$, $1_3$ may alternatingly be deactivated, each for a predefined time period. An operating mode of this type may be referred to as full 2/3 mode. In the full 2/3 mode, however, a midpoint current IY, which is the current into the midpoint Y, may be relatively high. The latter, however, negatively affects the power conversion losses.

In the 3/3 mode, the midpoint current IY, which is also referred to as common mode current in the following, may be reduced by suitably selecting the common mode voltage VCM. The midpoint current IY may even be reduced to zero by suitable selecting the common mode voltage, given that the common mode voltage that can be inserted is high enough. In the following, VCMzmc denotes the zero midpoint current (ZMC) common mode voltage, which is the common mode voltage at which the midpoint current IY is zero. The ZMC common mode voltage VCMzmc is given by $$VCMzmc = \text{min\_abs}\{VA'; VB'; VC'\} \cdot \left(1 + \frac{\text{min\_abs}\{VA'; VB'; VC'\}}{\text{max\_abs}\{VA'; VB'; VC'\}}\right), \quad (7)$$

where min _abs {VA';VB';VC'}, which is also referred to as Vmin_abs', is the one of the desired switch node voltages VA', VB', VC' that has the lowest absolute value. For example, Vmin_abs'=VA' if |VA'|<|VB'| and |VA'|<|VC'|. Thus, the absolute value of Vmin_abs' equals the absolute value of the switch node voltage that has the lowest absolute value, |Vmin_abs'|=min{|VA'|; |VB'|; |VC'|} and the sign of Vmin_abs' equals the sign of the switch node voltage having the lowest absolute value, so that Vmin_abs' can be positive or negative. Equivalently, max _abs {VA';VB';VC'}, which is also referred to as Vmax_abs', is the one of the desired switch node voltages VA', VB', VC' that has the highest absolute value. For example, Vmay_abs'=VA' if |VA'|>|VB'| and On the other hand, in order to achieve sinusoidal input currents I1, I2, I3 there are constraints on the first and second DC link node voltages VX, VZ such that the first DC link node voltage VX is equal to or higher than the maximum Vmax' of the desired switch node voltages VA', VB', VC' and the second DC link node voltage VZ is equal to or lower than the minimum Vmin' of the desired switch node voltages VA', VB', VC', that is $$VX \geq Vmax' \quad (8a)$$

$$VZ \leq Vmin' \quad (8b).$$

Referring to the above, $$VX = \frac{V4}{2} - VCM \text{ and } VZ = -\frac{V4}{2} - VCM,$$

so that based on equations (8a) and (8b) it can be shown that the common mode voltage VCM has to meet the following in equations in order to achieve sinusoidal input currents:

$$VCM \leq \frac{V4}{2} - Vmax' \quad (9a)$$

$$VCM \geq -\frac{V4}{2} - Vmin'. \quad (9b)$$

In the following, $$VCMmax = \frac{V4}{2} - Vmax' \quad (10a)$$

denotes the maximum allowed common mode voltage and $$VCMmin = -\frac{V4}{2} - Vmin' \quad (10b)$$

denotes the minimum allowed common mode voltage.

In order to achieve a zero midpoint current and sinusoidal input voltages, the following conditions should be met by the common voltage VCM, $$VCM = VCMzmc \quad (11a)$$

$$VCMmin \leq VCM \leq VCMmax \quad (11b).$$

However, in particular when the DC link voltage V4 is close to the maximum line-to-line voltage $V_{LL\_MAX}$ it is possible that both conditions (11a), (11b) cannot be met at the same time.

According to one example, operating the power converter in the 2/3+PWM mode includes (a) operating the power converter in the 3/3 mode whenever the ZMC common mode voltage VCMzmc is within a range given by the maximum and minimum common mode voltage VCMmax, VCMmin, that is, whenever $$VCmin \leq VCMzmc \leq VCMmax \quad (12a),$$

and (b) operating the power converter in the 2/3 mode whenever the ZMC common mode voltage VCMzmc is outside the range given by the maximum and minimum common mode voltage VCMmax, VCMmin, that is, whenever $$VCMzmc > VCMmax \quad (12b)$$

or $$VCMzmc < VCMmin \quad (12c).$$

According to one example, in the 3/3 mode the common mode voltage VCM is adjusted such that it equals the ZMC common mode voltage VCMzmc. In the 2/3 mode, the common mode voltage VCM may be adjusted in various ways such that it is within the range given by the maximum and the minimum common mode voltage VCMmax, VCMmin. According to one example, the common mode voltage VCM is adjusted such that it equals the maximum common mode voltage VCMmax when the ZMC common mode voltage VCMzmc is greater than the maximum common mode voltage VCMmax and such that it equals the minimum common mode voltage VCMmin when the ZMC common mode voltage VCMzmc is smaller than the minimum common mode voltage VCMmin.

Figure 20:
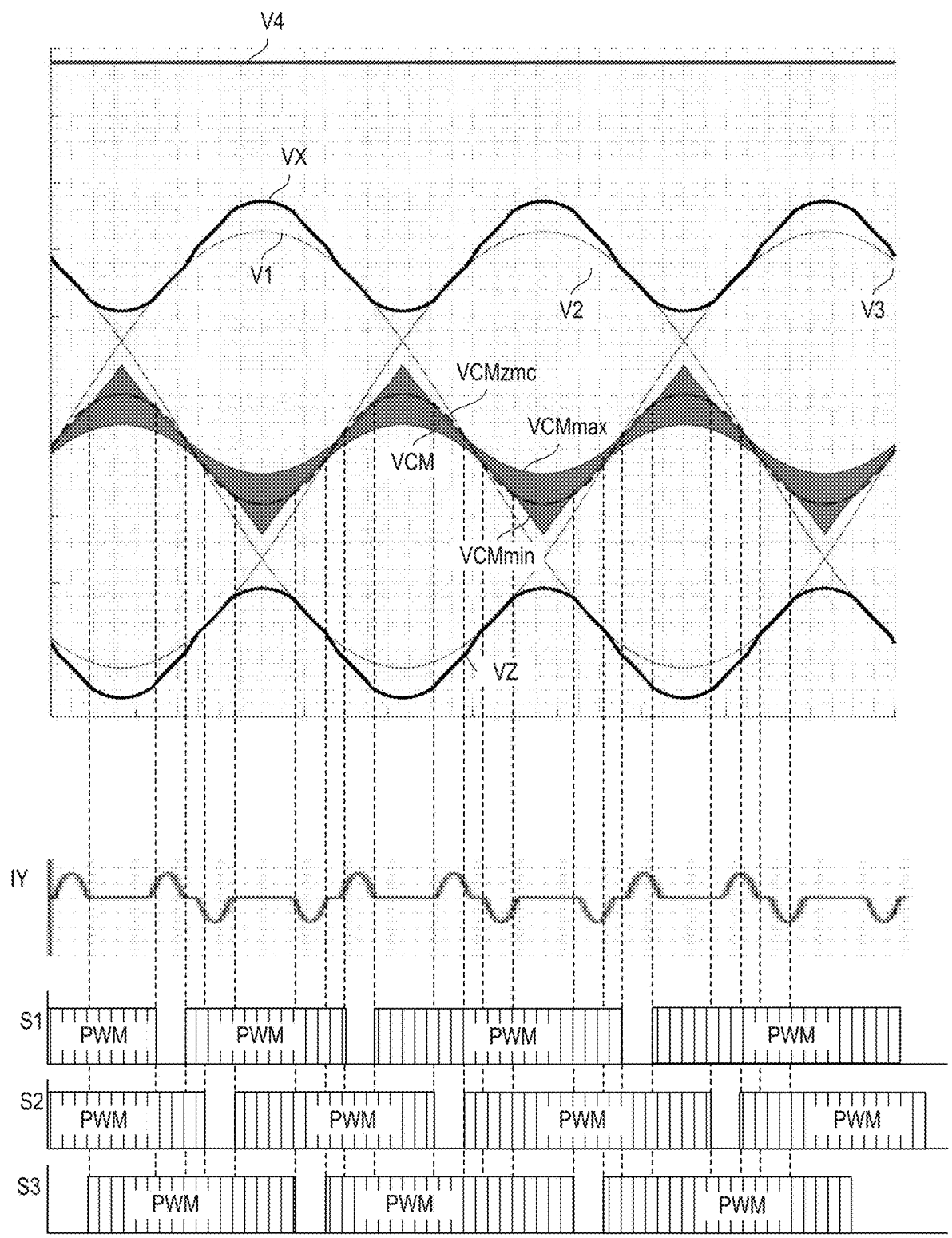
FIG. 20 shows signal diagrams that illustrate operating a power converter in a 2/3 mode or a 3/3 mode.

FIG. 20 shows signal diagrams that illustrate operating the power converter in the 2/3+PWM mode according to one example. In particular, FIG. 20 illustrates the DC link voltage V4, the input voltages V1, V2, V3, the maximum and minimum common mode voltages VCMmax, VCMmin, the ZMC common mode voltage VCMzmc, the common mode voltage VCM, and the drive signals S1, S2, S3. As can be seen from FIG. 20, the power converter operates in the PWM mode (3/3 mode) whenever the ZMC common mode voltage VCMzmc is within the range given by the maximum and the minimum common mode voltages VCMmax, VCMmin, wherein the common mode voltage VCM is adjusted such that it equals the ZMC common mode voltage VCMzmc. When the ZMC common mode voltage VCMzmc is outside the range given by the maximum and the minimum common mode voltages VCMmax, VCMmin the power converter operates in the 2/3 mode, wherein the common mode voltage VCM is adjusted such that it equals the maximum common mode voltage VCMmax when the ZMC common mode voltage VCMzmc is greater than the maximum common mode voltage VCMmax and such that it equals the minimum common mode voltage VCMmin when the ZMC common mode voltage VCMzmc is smaller than the minimum common mode voltage VCMmin. Further, referring to FIG. 20, the bridge legs $1_1, 1_2, 1_3$ are deactivated alternatingly. That is, when the power converter enters the 2/3 one of the bridge legs $1_1, 1_2, 1_3$ is deactivated and remains deactivated as long as the 2/3 mode prevails. The next time the power converter enters the 2/3 mode another one of the bridge legs $1_1, 1_2, 1_3$ is deactivated. In this way, the same bridge leg is deactivated every third time the power converter enters the 2/3 mode.

According to one example, this deactivation strategy is automatically achieved when calculating the duty cycles d1, d2, d3 in accordance with equations (4a), (4b), (4c) and limiting the common mode voltage VCM either to VCMmax or VCMmin, that is, adjusting the common mode voltage VCM such that it equals the maximum common mode voltage VCMmax when the ZMC common mode voltage VCMzmc is greater than the maximum common mode voltage VCMmax and such that it equals the minimum common mode voltage VCMmin when the ZMC common mode voltage VCMzmc is smaller than the minimum common mode voltage VCMmin. When the common mode voltage VCM is limited to VCMmax, the duty cycle of the bridge leg having the maximum switch node voltage Vmax' becomes +1, so that the respective bridge leg is automatically deactivated. Equivalently, when the common mode voltage VCM is limited to VCMmin, the duty cycle of the bridge leg having the minimum switch node voltage Vmin' becomes −1, so that the respective bridge leg is automatically deactivated.

FIG. 20 further illustrates the midpoint current IY. As can be seen, the midpoint current IY is zero in the 3/3 mode and different from zero only in those time periods (at those phase angles) in which the power converter operates in the 2/3 mode.

Basically, a duration of the time periods in which the power converter operates in the 2/3 mode in one period of the input voltages is dependent on the DC link voltage V4. This is illustrated in FIGS. 21 and 22.

Figure 21:
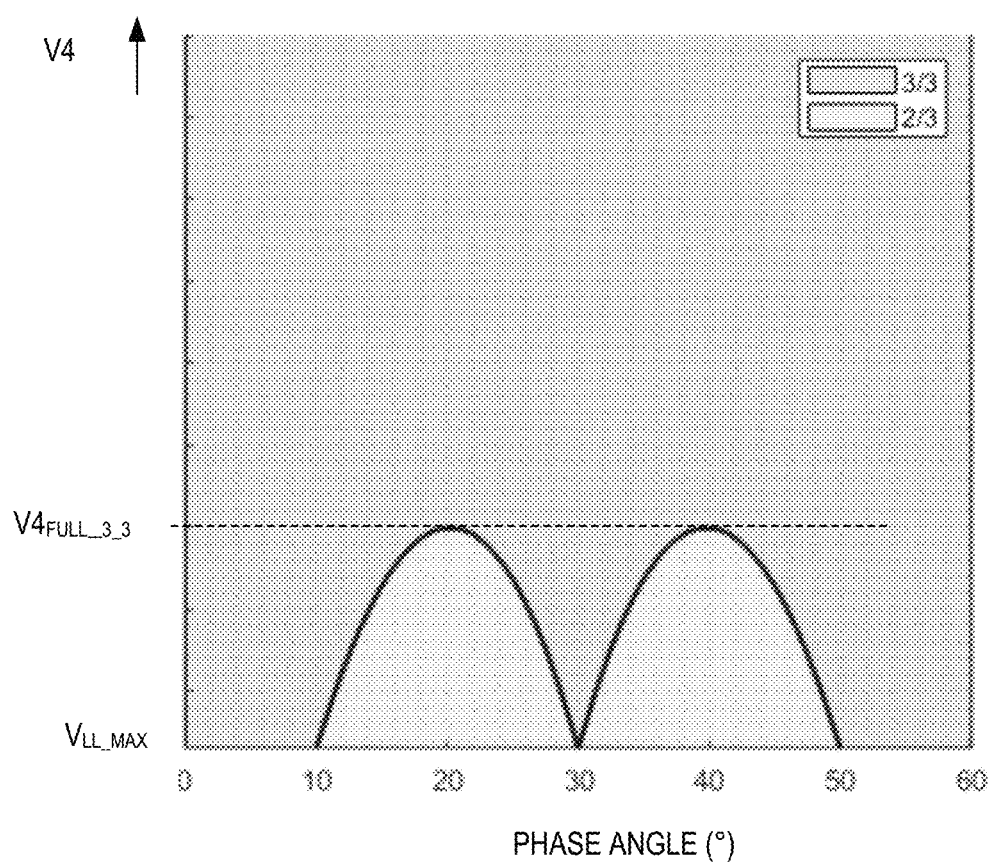
FIG. 21 illustrates the different operating modes shown in FIG. 20 dependent on a DC link voltage during one of six operating phases.
Figure 22:
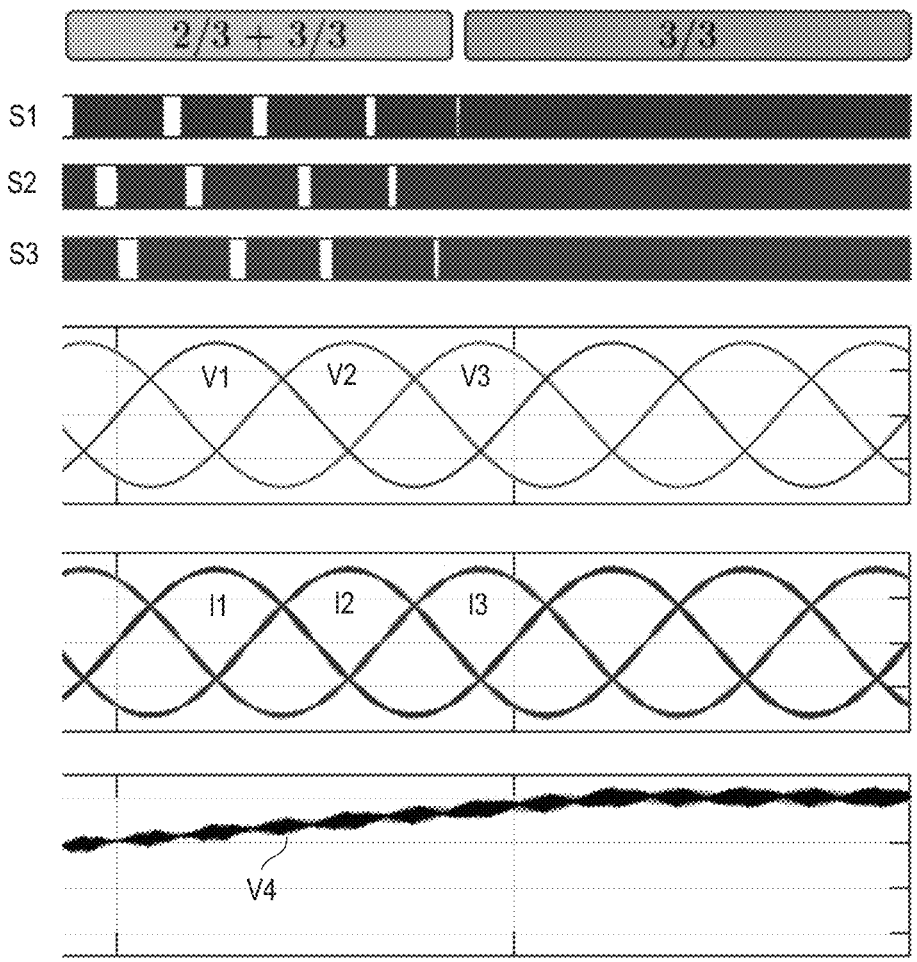
FIG. 22 shows signal diagrams of the power converter operating in the 2/3 mode or the 3/3 mode at different DC link voltages.

FIG. 21 illustrates the different operating modes of the first power converter 10 dependent on the DC link voltage V4 and the phase angle of the input voltages V1, V2, V3. More specifically, FIG. 21 illustrates the different operating modes in an arbitrary one of the six operating phases P1-P6, wherein each of these operating phases covers 60° of one period of the input voltages V1, V2, V3. In FIG. 16, a phase angle of 0° represents the beginning of the respective operating phase, a phase angle of 60° represents the end of the respective operating phase, and a phase angle of 30° represents the middle of the respective operating phase, which is when the intermediate input voltage in the respective operating phase crosses zero.

Referring to the above, the power converter may operate in the 2/3+PWM mode when the DC link voltage V4 is greater than the maximum line-to-line voltage $V_{LL\_MAX}$. In the 2/3+PWM mode, the portion of the operating phase in which the power converter operates in the 3/3 mode increases as the DC link voltage V4 increases and the portion of the operating phase in which the power converter operates in the 2/3 mode decreases as the minimum desired DC link voltage V4MIN increases. Further, the power converter operates in the full 3/3 mode when the DC link voltage V4 is such that the ZMC common mode voltage VCzmc is within the range given by the maximum and the minimum common mode voltage VCMmax, VCMmin throughout one period of the input voltages V1, V2, V3. A DC link voltage threshold $V4_{FULL\_3\_3}$ at which the power converter changes from the 2/3+PWM mode to the full 3/3 mode is greater than the maximum line-to-line voltage $VLL_{MAX}$ and smaller than twice the amplitude of the input voltages V1, V2, V3.

Referring to the above it would be possible to operate the power converter in the 2/3 mode at each DC link voltage V4 higher than the maximum line-to-line voltage $V_{LL\_MAX}$. Thus, it would be possible to operate the power converter in the 2/3 mode or the 2/3+PWM mode at DC link voltages higher than $V4_{FULL\_3\_3}$. This, however, would increase the midpoint current IY and is therefore undesirable. Operating the power converter in the 2/3+PWM mode at DC link voltages between the maximum line-to-line voltage $V_{LL\_MAX}$ and $V4_{FULL\_3\_3}$, however, helps to reduce losses.

FIG. 22 shows signal diagrams of the drive signals S1, S2, S3, the input voltages and the input currents I1, I2, I3 and of the DC link voltage in the 2/3+PWM mode and the full 3/3 mode. As can also be seen from these signal diagrams, a duration of the time periods in which the power converter operates in the 2/3 mode decrease as the DC link voltage V4 increases.

Figure 23:
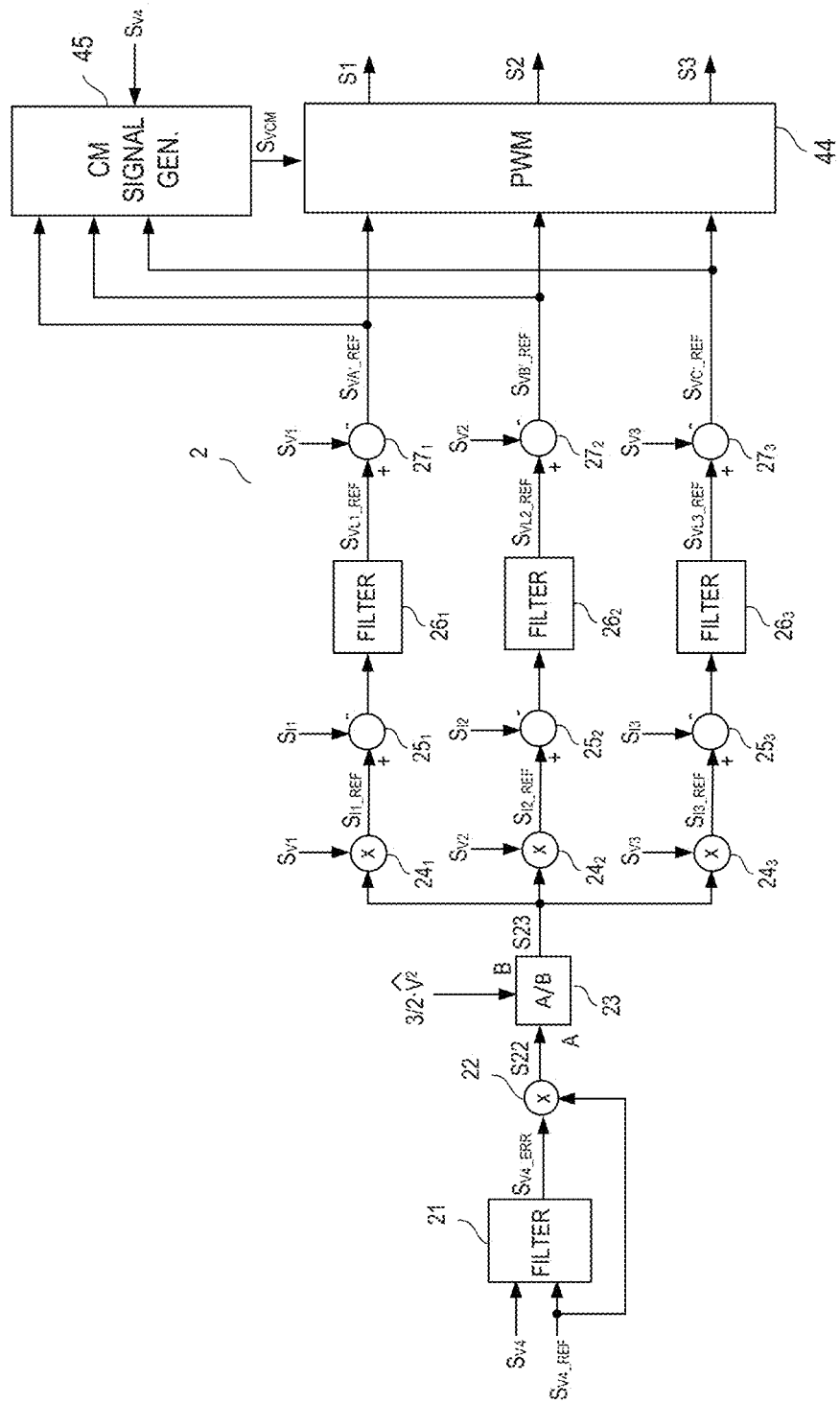
FIG. 23 illustrates one example of a control circuit configured to operate the power converter in the 2/3 mode or the 3/3 mode.

A power converter of the type illustrated in FIG. 1 or 3 may be operated in the 2/3+PWM mode by a control circuit of the type illustrated in FIG. 23. This control circuit is based on the control circuit shown in FIG. 6 and includes a PWM modulator 44 of the type explained hereinbefore that generates duty cycles of the drive signals S1, S2, S3 in accordance with equations (4a)-(4c). Further, a common mode signal generator 45 is configured to generate the common mode voltage signal $S_{VCM}$ received by the PWM modulator in such a way that (a) the common mode voltage VCM represented by the common mode voltage signal $S_{VCM}$ equals the ZMC common mode voltage VCMzmc when the ZMC common mode voltage VCMzmc is within the range given by the maximum and minimum common mode voltage VCMmax, VCMmin and (b) such that the common mode voltage VCM it is within the range given by the maximum and the minimum common mode voltage VCMmax, VCMmin when the ZMC common mode voltage VCMzmc is outside this range. For calculating the maximum, minimum and ZMC common mode voltages VCMmax, VCMmin, VCMzmc in accordance with equations (7), (10a), (10b) the common mode signal generator 45 receives the DC link voltage signal $S_{V4}$ that represents the DC link voltage V4 and the switch node voltage reference signals $S_{VA'\_REF}, S_{VB'\_REF}, S_{VC'\_REF}$, which represent the desired switch node voltages VA', VB', VC'.

In the above explanation it has been assumed that the (first) power converter 10 may operate in the 2/3+PWM mode when the DC link voltage V4 is higher than the maximum line-to-line-voltage $V_{LL\_MAX}$. When the DC link voltage V4 is higher than the maximum line-to-line-voltage $V_{LL\_MAX}$ the power converter operates in a full-boost mode. A 2/3+PWM mode, however, may also be used when the power converter 10 operates in the partial boost-mode explained above. This is illustrated with reference to FIGS. 24 and 25 in the following.

Figure 24:
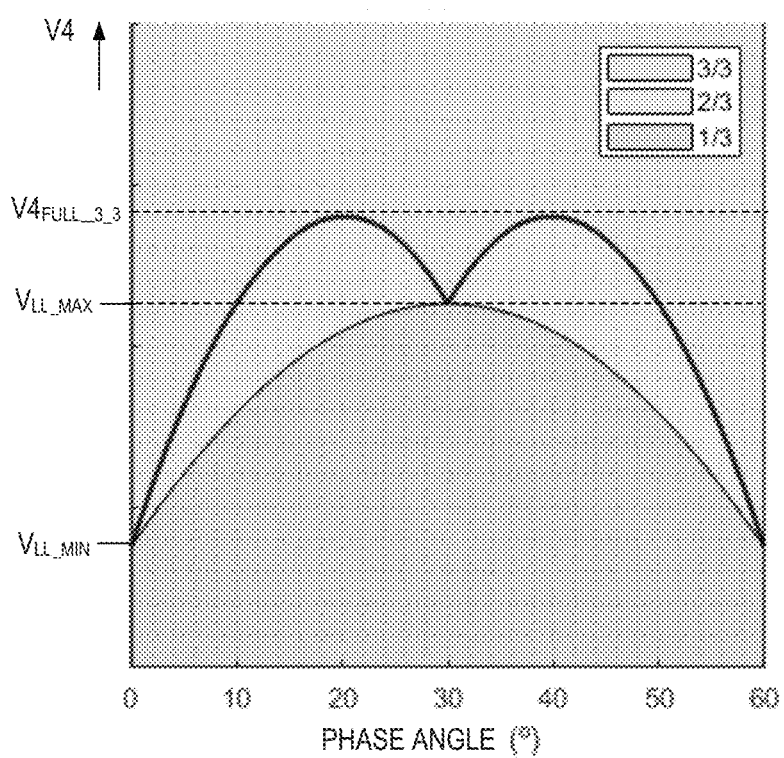
FIG. 24 illustrates operating a power converter in one of a 1/3 mode, a 2/3 mode, or a 3/3 mode dependent on a DC link voltage during one of six operating phases.

FIG. 24 illustrates the different operating modes of the first power converter 10 dependent on the DC link voltage V4 and the phase angle of the input voltages V1, V2, V3 in an arbitrary one of the six operating phases P1-P6. Referring to the above, the power converter operates in the partial-boost mode when the DC link voltage V4 is essentially between the minimum line-to-line voltage $V_{LL\_MIN}$ and the maximum line-to-line voltage $V_{LL\_MAX}$. In the example illustrated in FIG. 24, in the partial-boost mode, the power converter either operates in the 1/3 mode, the 2/3 mode or the 3/3 mode, wherein a phase angle range (a duration of a time period) in which the power converter operates in the 1/3 mode decreases and in which the power converter operates in the 2/3 or the 3/3 mode increases as the DC link voltage V4 increases.

Figure 25:
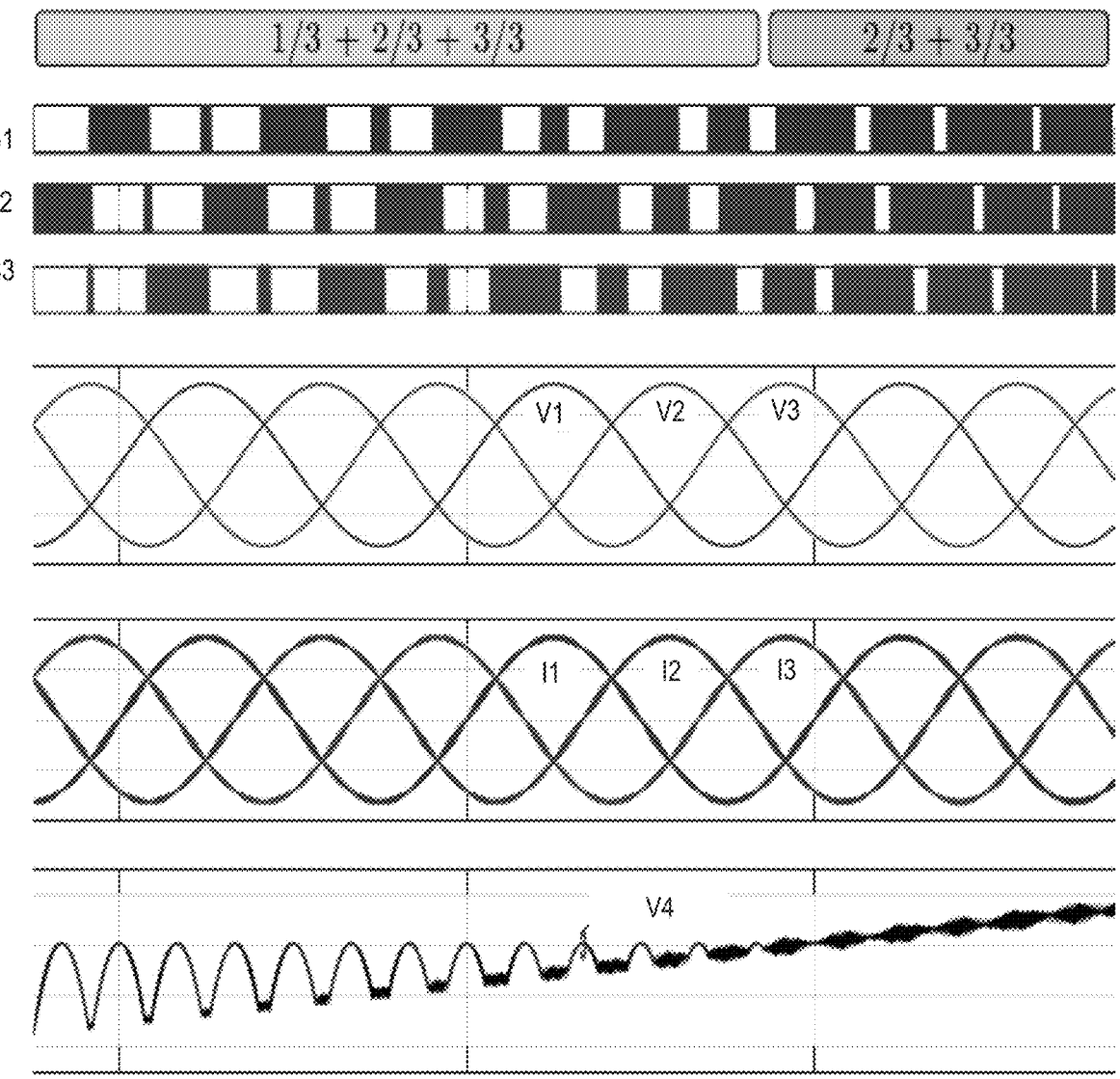
FIG. 25 shows signal diagrams of the power converter operating in the 1/3 mode, the 2/3 mode, or the 3/3 mode at different DC link voltages.

FIG. 25 shows corresponding signal diagrams that illustrate operating the power converter in the partial-boost mode and the 2/3+PWM mode.

Operating the first power converter 10 in a partial boost mode of the type illustrated in FIGS. 23 and 24 may be achieved by a control circuit of the type illustrated in FIG. 10 when the common mode voltage signal $S_{VCM}$ is generated by a common mode voltage signal generator 45 of the type explained with reference to FIG. 22. In this case, when the DC link voltage V4 is generated by the second power converter 5 such that it equals the voltage represented by Smax'−Smin' the common mode voltage signal generator 45 automatically generates the common mode signal automatically such that the common mode voltage VCM is in accordance with equation (5), which is the common mode voltage used in the 1/3 mode.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
operating a power converter in a reduced switching mode, wherein the power converter comprises:
three input nodes each configured to receive a respective one of three input voltages;
two DC link nodes configured to provide a DC link voltage, and a midpoint coupled to each of the two DC link nodes;
three inductors each connected to a respective one of the three input nodes; and
a rectifier bridge comprising three bridge legs each coupled to a respective one of the three inputs through a respective one of the three inductors and connected to the respective one of the three inductors at a respective switch node, wherein each of the three bridge legs is connected to the two DC link nodes and the midpoint, and comprises at least one electronic switch,
wherein operating the power converter in the reduced switching mode comprises:
deactivating at least one of the three bridge legs for a predefined time period wherein operating the power converter in the reduced switching mode comprises operating the power converter in a 1/3 mode,
wherein operating the power converter in the 1/3 mode comprises:
deactivating two of the three bridge legs and activating one of the three bridge legs for a certain portion of a period of the input voltages;
calculating a desired switch node voltage for each of the three bridge legs;
deactivating the one of the three bridge legs associated with a maximum of the desired switch node voltages; and
deactivating the one of the three bridge legs associated with a minimum of the desired switch node voltages,
wherein the method further comprises regulating the DC link voltage by a further power converter,
wherein each of the desired switch node voltages is dependent on an output parameter of the further power converter and a respective one of the input voltages,
wherein regulating the DC link voltage by the further power converter comprises regulating the DC link voltage dependent on a difference between a maximum of the desired switch node voltages and a minimum of the desired switch node voltages.

2. The method of claim 1, further comprising:
operating the power converter in the 1/3 mode throughout the period of the three input voltages.

3. The method of claim 2, further comprising:
operating the power converter in a 3/3 mode, in which none of the three bridge legs is deactivated, in the remainder of the period of the three input voltages.

4. The method of claim 2, further comprising:
operating the power converter in a 2/3 mode, in which one of the three bridge legs is deactivated, or in a 3/3 mode, in which none of the three bridge legs is deactivated, in the remainder of the period of the three input voltages.

5. The method of claim 1, further comprising:
operating the power converter in the 1/3 mode in a certain portion of the period of the three input voltages.

6. The method of claim 1, wherein the output parameter is an output current of the second power converter.

7. The method of claim 1, wherein the output parameter is an output voltage of the second power converter.

8. The method of claim 1, further comprising:
adjusting a switch node voltage of an activated one of the three bridge legs by a switched-mode operation of the at least one electronic switch in the activated bridge leg dependent on the desired switch node voltage associated with the activated bridge leg.

9. The method of claim 1, wherein operating the power converter in the reduced switching mode comprises operating the power converter in a 2/3 mode, and wherein operating the power converter in the 2/3 mode comprises deactivating one of the three bridge legs and activating two of the three bridge legs for a certain portion of a period of the input voltages.

10. The method of claim 9, wherein operating the power converter in the 2/3 mode comprises:
calculating a zero midpoint current common mode voltage, a minimum desired common mode voltage, and maximum desired common mode voltage; and
operating the power converter in the 2/3 mode when the common mode voltage is outside a voltage range defined by the minimum desired common mode voltage and the maximum desired common mode voltage.

11. The method of claim 10, further comprising adjusting the common mode voltage such that the common mode voltage equals the maximum desired common mode voltage when the ZMC common mode voltage is greater than the maximum desired common mode voltage, and equals the minimum desired common mode voltage when the ZMC common mode voltage is smaller than the minimum desired common mode voltage.

12. A power converter arrangement, comprising:
a first power converter, a second power converter, and a control circuit configured to control operation of the first power converter and the second power converter, wherein the first power converter comprises:
three input nodes each configured to receive a respective one of three input voltages;
two DC link nodes configured to provide a DC link voltage, and a midpoint coupled to each of the two DC link nodes;
three inductors each connected to a respective one of the three input nodes; and
a rectifier bridge comprising three bridge legs each coupled to a respective one of the three inputs through a respective one of the three inductors and connected to the respective one of the three inductors at a respective switch node, wherein each of the three bridge legs is connected to the two DC link nodes and the midpoint, and comprises at least one electronic switch,
wherein the control circuit is configured to control operation of the second power converter such that the second power converter regulates a DC link voltage between the two DC link nodes of the first power converter,
wherein the control circuit is configured to calculate desired switch node voltages each associated with one of the three bridge legs in the first power converter dependent on an output parameter and a respective one of the input voltages,
wherein the control circuit is configured to control operation of the second power converter such that the DC link voltage is dependent on the desired switch node voltages,
wherein the control circuit is further configured to control operation of the second power converter such that the DC link voltage is further dependent on a signal representing a minimum desired DC link voltage,
wherein the control circuit is configured to control operation of the second power converter such that the DC link voltage is dependent on a difference between a maximum of the desired switch node voltages and a minimum of the desired switch node voltages.

13. The power converter arrangement of claim 12, wherein the control circuit is further configured:
for each of the three bridge legs, to calculate a respective duty cycle dependent on a respective one of the desired switch node voltages; and
to operate the at least one switch in each of the three bridge legs dependent on the respective duty cycle.

14. The power converter arrangement of claim 13, wherein the control circuit is further configured to determine a desired common mode voltage and calculate each of the duty cycles further dependent on the desired common mode voltage.

15. The power converter arrangement of claim 14, wherein the control circuit is configured to determine the desired common mode voltage by:
calculating a maximum desired common mode voltage and a minimum desired common mode voltage; and
selecting the desired common mode voltage such that the desired common mode voltage is within a range given by the maximum desired common mode voltage and the minimum desired common mode voltage.

16. The power converter arrangement of claim 15, wherein each of the maximum desired common mode voltage and the minimum desired common mode voltage is dependent on the DC link voltage and the desired switch node voltages.

17. The power converter arrangement of claim 15, wherein the control circuit is further configured:
to calculate a zero midpoint current common mode voltage; and
to select the desired common mode voltage such that the desired common mode voltage equals the ZMC common mode voltage when the ZMC common mode voltage is within a range given by the maximum desired common mode voltage and the minimum desired common mode voltage.

18. A method, comprising:
regulating a DC link voltage of a first power converter by a second power converter,
wherein the first power converter comprises:
three input nodes each configured to receive a respective one of three input voltages;
two DC link nodes configured to provide the DC link voltage, and a midpoint coupled to each of the two DC link nodes;
three inductors each connected to a respective one of the three input nodes;
a rectifier bridge comprising three bridge legs each coupled to a respective one of the three inputs through a respective one of the three inductors and connected to the respective one of the three inductors at a respective switch node, wherein each of the three bridge legs is connected to the two DC link nodes and the midpoint, and comprises at least one electronic switch;
calculating desired switch node voltages each associated with one of the three bridge legs in the first power converter dependent on an output parameter and a respective one of the input voltages; and
regulating the DC link voltage such that the DC link voltage is dependent on the desired switch node voltages,
wherein the DC link voltage is further dependent on a signal representing a minimum desired DC link voltage,
wherein the DC link voltage is dependent on a difference between a maximum of the desired switch node voltages and a minimum of the desired switch node voltages.

19. The method of claim 18, further comprising:
calculating a respective duty cycle for each of the three bridge legs, dependent on a respective one of the desired switch node voltages; and
operating the at least one switch in each of the three bridge legs dependent on the respective duty cycle.

20. The method of claim 19, further comprising:
determining a desired common mode voltage; and
calculating each of the duty cycles further dependent on the desired common mode voltage.

21. The method of claim 20, wherein determining the desired common mode voltage comprises:
calculating a maximum desired common mode voltage and a minimum desired common mode voltage; and
selecting the desired common mode voltage such that the desired common mode voltage is within a range given by the maximum desired common mode voltage and the minimum desired common mode voltage.

22. The method of claim 21, wherein each of the maximum desired common mode voltage and the minimum desired common mode voltage is dependent on the DC link voltage and the desired switch node voltages.

23. The method of claim 21, further comprising:
calculating a zero midpoint current (ZMC) common mode voltage; and
selecting the desired common mode voltage such that the desired common mode voltage equals the ZMC common mode voltage when the ZMC common mode voltage is within a range given by the maximum desired common mode voltage and the minimum desired common mode voltage.

24. A method, comprising:
operating a power converter in a reduced switching mode, wherein the power converter comprises:
three input nodes each configured to receive a respective one of three input voltages;
two DC link nodes configured to provide a DC link voltage, and a midpoint coupled to each of the two DC link nodes;
three inductors each connected to a respective one of the three input nodes; and
a rectifier bridge comprising three bridge legs each coupled to a respective one of the three inputs through a respective one of the three inductors and connected to the respective one of the three inductors at a respective switch node, wherein each of the three bridge legs is connected to the two DC link nodes and the midpoint, and comprises at least one electronic switch,
wherein operating the power converter in the reduced switching mode comprises deactivating at least one of the three bridge legs for a predefined time period,
wherein operating the power converter in the reduced switching mode comprises operating the power converter in a 2/3 mode,
wherein operating the power converter in the 2/3 mode comprises deactivating one of the three bridge legs and activating two of the three bridge legs for a certain portion of a period of the input voltages,
wherein operating the power converter in the 2/3 mode comprises:
calculating a zero midpoint current common mode voltage, a minimum desired common mode voltage, and maximum desired common mode voltage; and
operating the power converter in the 2/3 mode when the common mode voltage is outside a voltage range defined by the minimum desired common mode voltage and the maximum desired common mode voltage.

25. The method of claim 24, further comprising adjusting the common mode voltage such that the common mode voltage equals the maximum desired common mode voltage when the ZMC common mode voltage is greater than the maximum desired common mode voltage, and equals the minimum desired common mode voltage when the ZMC common mode voltage is smaller than the minimum desired common mode voltage.

26. A power converter arrangement, comprising:
a first power converter, a second power converter, and a control circuit configured to control operation of the first power converter and the second power converter,
wherein the first power converter comprises:
three input nodes each configured to receive a respective one of three input voltages;
two DC link nodes configured to provide a DC link voltage, and a midpoint coupled to each of the two DC link nodes;
three inductors each connected to a respective one of the three input nodes; and
a rectifier bridge comprising three bridge legs each coupled to a respective one of the three inputs through a respective one of the three inductors and connected to the respective one of the three inductors at a respective switch node, wherein each of the three bridge legs is connected to the two DC link nodes and the midpoint, and comprises at least one electronic switch,
wherein the control circuit is configured to control operation of the second power converter such that the second power converter regulates a DC link voltage between the two DC link nodes of the first power converter,
wherein the control circuit is configured to calculate desired switch node voltages each associated with one of the three bridge legs in the first power converter dependent on an output parameter and a respective one of the input voltages, and wherein the control circuit is configured to control operation of the second power converter such that the DC link voltage is dependent on the desired switch node voltages,
wherein the control circuit is further configured to control operation of the second power converter such that the DC link voltage is further dependent on a signal representing a minimum desired DC link voltage,
wherein the control circuit is further configured:
for each of the three bridge legs, to calculate a respective duty cycle dependent on a respective one of the desired switch node voltages; and
to operate the at least one switch in each of the three bridge legs dependent on the respective duty cycle,
wherein the control circuit is further configured to determine a desired common mode voltage and calculate each of the duty cycles further dependent on the desired common mode voltage,
wherein the control circuit is configured to determine the desired common mode voltage by:
calculating a maximum desired common mode voltage and a minimum desired common mode voltage; and
selecting the desired common mode voltage such that the desired common mode voltage is within a range given by the maximum desired common mode voltage and the minimum desired common mode voltage.

27. The power converter arrangement of claim 26, wherein each of the maximum desired common mode voltage and the minimum desired common mode voltage is dependent on the DC link voltage and the desired switch node voltages.

28. The power converter arrangement of claim 26, wherein the control circuit is further configured:
to calculate a zero midpoint current common mode voltage; and
to select the desired common mode voltage such that the desired common mode voltage equals the ZMC common mode voltage when the ZMC common mode voltage is within a range given by the maximum desired common mode voltage and the minimum desired common mode voltage.

29. A method, comprising:
regulating a DC link voltage of a first power converter by a second power converter,
wherein the first power converter comprises:
three input nodes each configured to receive a respective one of three input voltages;
two DC link nodes configured to provide the DC link voltage, and a midpoint coupled to each of the two DC link nodes;

three inductors each connected to a respective one of the three input nodes;
a rectifier bridge comprising three bridge legs each coupled to a respective one of the three inputs through a respective one of the three inductors and connected to the respective one of the three inductors at a respective switch node, wherein each of the three bridge legs is connected to the two DC link nodes and the midpoint, and comprises at least one electronic switch;
calculating desired switch node voltages each associated with one of the three bridge legs in the first power converter dependent on an output parameter and a respective one of the input voltages;
regulating the DC link voltage such that the DC link voltage is dependent on the desired switch node voltages, wherein the DC link voltage is further dependent on a signal representing a minimum desired DC link voltage;
calculating a respective duty cycle for each of the three bridge legs, dependent on a respective one of the desired switch node voltages;
operating the at least one switch in each of the three bridge legs dependent on the respective duty cycle;
determining a desired common mode voltage; and
calculating each of the duty cycles further dependent on the desired common mode voltage,
wherein determining the desired common mode voltage comprises:
calculating a maximum desired common mode voltage and a minimum desired common mode voltage; and
selecting the desired common mode voltage such that the desired common mode voltage is within a range given by the maximum desired common mode voltage and the minimum desired common mode voltage.

30. The method of claim 29, wherein each of the maximum desired common mode voltage and the minimum desired common mode voltage is dependent on the DC link voltage and the desired switch node voltages.

31. The method of claim 29, further comprising:
calculating a zero midpoint current (ZMC) common mode voltage; and
selecting the desired common mode voltage such that the desired common mode voltage equals the ZMC common mode voltage when the ZMC common mode voltage is within a range given by the maximum desired common mode voltage and the minimum desired common mode voltage.

* * * * *

UNITED STATES PATENT AND TRADEMARK OFFICE
CERTIFICATE OF CORRECTION

PATENT NO. : 11,165,339 B2  
APPLICATION NO. : 16/817916  
DATED : November 2, 2021  
INVENTOR(S) : D. Bortis et al.

It is certified that error appears in the above-identified patent and that said Letters Patent is hereby corrected as shown below:

On the Title Page

Other Publications, Column 2, Line 1, please change "bus fora" to -- bus for a --

In the Claims

Column 29, Line 60 (Claim 1, Line 22) please change "period wherein" to -- period, wherein --

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*